United States Patent

Loizides et al.

[15] 3,643,226

[45] Feb. 15, 1972

[54] MULTILEVEL COMPRESSED INDEX SEARCH METHOD AND MEANS

[72] Inventors: Edward Loizides; Donald J. Lucas, both of Poughkeepsie; George F. Steigerwalt, Hyde Park, all of N.Y.

[73] Assignee: International Business Machines Corporation, Armonk, N.Y.

[22] Filed: June 26, 1969

[21] Appl. No.: 836,825

[52] U.S. Cl. ....................340/172.5

[51] Int. Cl. ....................G06f 7/22

[58] Field of Search ....................235/157; 340/172.5

[56] References Cited

UNITED STATES PATENTS

| | | | |
|---|---|---|---|
| 3,030,609 | 4/1962 | Albrecht | 340/172.5 |
| 3,242,470 | 3/1966 | Hagelbarger et al | 340/172.5 |
| 3,315,233 | 4/1967 | de Campo et al. | 340/172.5 |
| 3,323,108 | 5/1967 | Mullery et al. | 340/172.5 |
| 3,333,251 | 7/1967 | Brenza et al. | 340/172.5 |
| 3,366,928 | 1/1968 | Rice et al. | 340/172.5 |
| 3,408,631 | 10/1968 | Evans et al. | 340/172.5 |
| 3,448,436 | 6/1969 | Machol, Jr. | 340/172.5 |

*Primary Examiner*—Paul J. Henon
*Assistant Examiner*—Melvin B. Chapnick
*Attorney*—Hanifin and Jancin and Bernard M. Goldman

[57] ABSTRACT

A method and means for searching a compressed index generated by the method and means disclosed in U.S. Pat. application Ser. No. 836,930 filed the same day as this application. Two types of searches are disclosed, (1) a multilevel search, and (2) a one-level search. The multilevel search begins at the highest, or apex level of a multilevel compressed index and searches one block at each level. The multilevel search ends after finding a pointer at the lowest level in the index. The pointer found at the lowest level addresses a data block containing the information searched for. The one-level search can enter the multilevel index at any level and serial search plural blocks for the correct pointer to a block at the next lower level.

42 Claims, 32 Drawing Figures

INVENTORS
EDWARD LOIZIDES
DONALD J. LUCAS
GEORGE F. STEIGERWALT
BY Bernard M. Goldman
ATTORNEY

LEVEL CONTROL TABLES

POINTER TABLES

FIG. 9A (SEARCH)
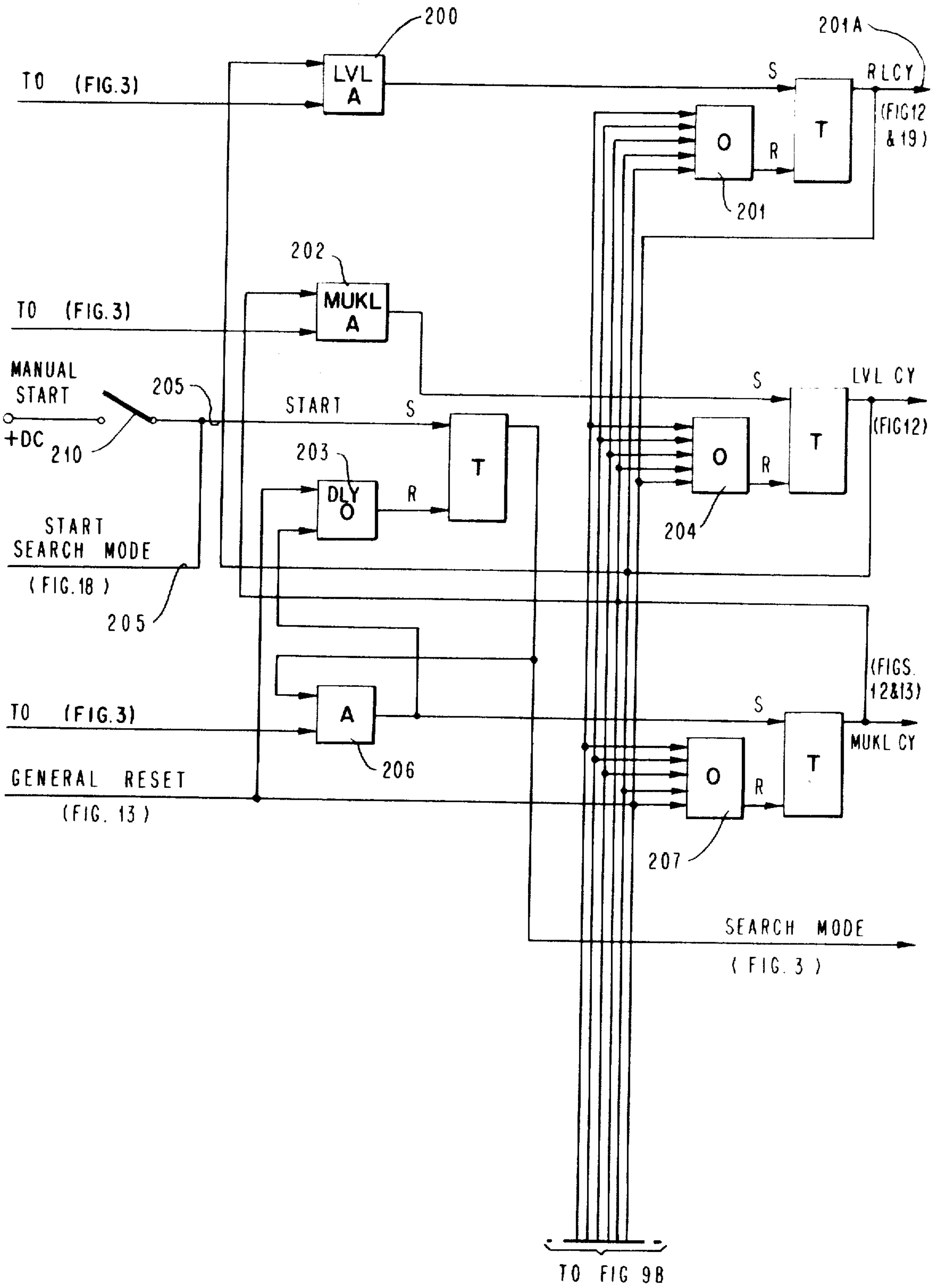

(SEARCH)

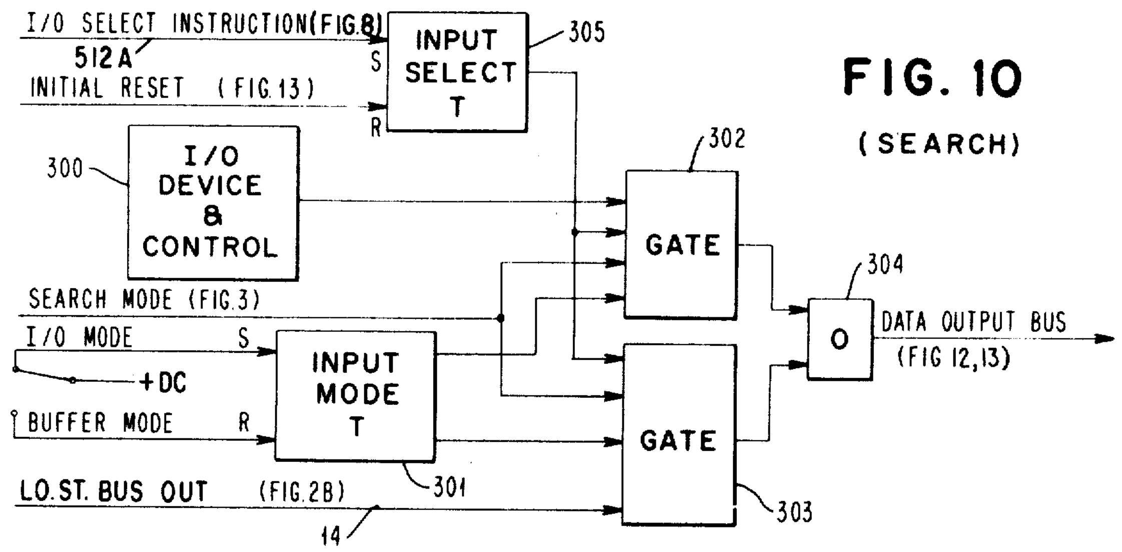
FIG. 10 (SEARCH)
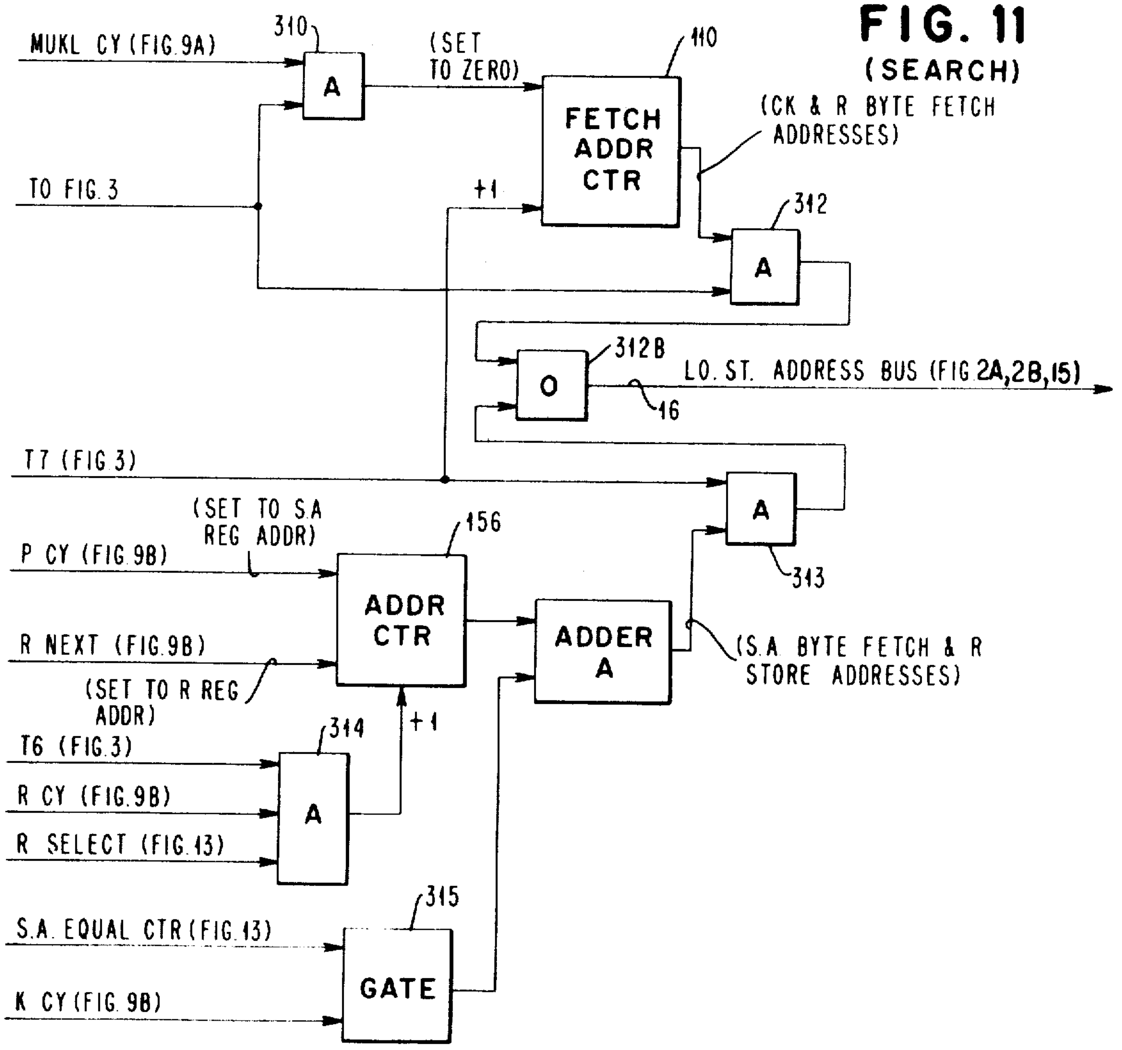
FIG. 11 (SEARCH)

(SEARCH)

PATENTED FEB 15 1972 3,643,226

SHEET 14 OF 21

MULTILEVEL COMPRESSED INDEX SEARCH METHOD AND MEANS

BACKGROUND OF THE INVENTION

This invention relates generally to information retrieval and particularly to a new electronically controlled technique for searching multilevel machine-readable indexes. Basic methods and means for machine generation and machine searching of compressed indexes on a single level are disclosed and claimed in U.S. Pat. applications Ser. Nos. 788,807, 788,835 and 788,876 filed on Jan. 3, 1969, and owned by the same assignee as the subject application.

Information of every sort is being generated at an ever increasing rate. It is becoming ever more apparent that a bottleneck often exists in not being able to quickly retrieve an item of information from the mass of information in which it is buried. Although much work has been done on information retrieval, no overall solution has been found thus far, even though many sophisticated information retrieval techniques have been conceived for accessing of information involving large numbers of documents or records.

Within the information retrieval environment, the invention relates to a tool useful in controlling a machine to locate information indexed by keys. The term, key, is used here in the sense that it is normally understood in the computer arts, for example, see its definition in "Computer Dictionary" by Charles J. Sippl, published in 1966. The term, uncompressed key (UK), is often used herein, and it is identical in meaning to the term, key, as ordinarily understood. The reason for adding the descriptor "uncompressed" in this specification is to distinguish the ordinary key, which has an uncompressed form, from its reduced form (described in prior application No. 788,876) which is called by the term, compressed key. Any type of alphanumeric keys arranged in sorted sequence can be converted into compressed-key form and searched by the subject invention. Each compressed key represents a boundary (either high or low) for the uncompressed key it represents. Each compressed key may have associated with it data, or the location of one or more items of information it represents. The location information may be an attached address, pointer, or it may be derivable from the key itself by means not part of this invention.

The subject invention is inclusive of an inventive algorithm for searching a compressed multilevel index to greatly improve the speed of multilevel searching compared to searching the index in uncompressed form.

Methods and means for searching an uncompressed multilevel index are known and have been disclosed in the past. Uncompressed index searching is being electronically performed with computer systems, using special access methods, control means, and electronic cataloging techniques. U.S. Pat. Nos. 3,408,631 to J. R. Evans et al., 3,315,233 to R. De Campo et al.; and 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed key format in multilevel index form results in having to scan a large number of bytes in every key entry while looking for a search argument. This is time consuming and costly when searching a large index, or when repeatedly searching a small index. It is this area which is attacked by the subject invention, which greatly reduces the number of scanned bytes per key entry in a searched index. A result obtained is smaller search-storage requirements and faster searching due to less bytes needing to be machine sensed. A significant increase in searching speed results without changing the speed of a computer system.

Current electronic computer search techniques, such as in the above-cited patents, have uncompressed keys accompanying records on a disk or drum for indexing the subject matter contained in an associated record. A search for the associated record may be done either by the key or by the address of the record. For example in U.S. Pat. Nos. 3,408,631; 3,350,693; 3,343,134; 3,344,402; 3,344,403 and 3,344,405 an uncompressed key can be indexed on a magnetically recorded disk. A key in a multilevel environment can be electronically scanned by a search argument for a compare-equal condition. Upon having a compare-equal condition, a pointer address associated with the respective uncompressed key is obtained and used to retrieve the record at a lower level represented by the key which may be elsewhere on the same device or on a different device. This pointer, for example, may include the location on the disk device, or on another device, where the next lower level record is recorded. The lowest index level locates the data record being sought, and the record may then be retrieved and used for any required purpose.

DEFINITION TABLE

A Byte: Any single byte in the search argument which is currently being searched for in the compressed index. The position of the current A-byte in the search argument is indicated by the current setting of the equal counter.

Apex Level: The highest level in the index. It usually comprises only a single block.

Binary Search: A search in which a set of sorted items is divided into two parts, where one part is rejected, and the process is repeated on the accepted part until the item with the desired property is found. (The binary search is a well known computer programming technique for finding an argument in a sorted table.)

Block: A collection of recorded information which is machine accessible as a unit. A block is also called a Record. The meaning of block and record ordinarily found in the computer arts is applicable.

Boundary Pair: A pair of uncompressed keys which include the last uncompressed key used in the generation of a low-level compressed index block, and the first uncompressed key used in the generation of the next logically sequential low level compressed index block.

Compressed Block: An index block comprising compressed index entries. It is also called a Compressed Index Block. It is a Low-Level Compressed Block if it is part of a low index level. It is a High-Level Compressed Block if it is part of a high index level.

Compressed Index: An index of keys which are compressed by the method described in prior application No. 788,807 or 788,876.

Equal Counter: A counter or register which indicates the current number of consecutive high-order bytes of the search argument found during the search of a compressed index. The equal counter setting is initialized before searching an index block to indicate the highest order byte position in the search argument. The equal counter is incremented each time a selected K-byte is equal to the current A-byte.

High Index Level: A grouping of index block's having entries with pointers that address index block's in a lower index level; that is, the pointers in a high level do not address data blocks. Every index level, except the lowest level, is a high index level.

High-Level Block: An index block in any high index level. Compressed or uncompressed keys may be included in the block.

Index: A recorded compilation of keys with associated pointers for locating information in a machine-readable file, data set, or data base. The keys and pointers are accessible to and readable by a computer system. The purpose of the index is to aid the retrieval of required data blocks.

Index Block: A sequence of index entries which are grouped into a single machine-accessible entity.

Index Entry: An element of an index block having a single pointer. The entry may contain compressed or uncompressed key(s).

Compressed Index Entry: An index entry having at least one compressed key and a related pointer. A High-Level Index Entry includes two compressed keys and a pointer. A Low-Level Index Entry includes one compressed key and a pointer.

Compressed Key A reduced form of a key which in most situations contains substantially fewer number of characters, or bits, than the original key it represents. It is generated by the method described in prior application No. 788,807 or 788,876. It is generally referenced by its acronym CK. A CK is sometimes referred to by its format, PK, in which P is a position byte, and K is one or more key byte(s).

Compressed Key Format: The PK form of a compressed key, generated by the method described in prior application No. 788,876, in which P is a position byte, and K is one or more key bytes. The Low-Level Compressed Entry Format is CK,R (equivalent to PK,R) in which R is a related pointer, and the High-Level Compressed Entry Format is CK,CK,R (which is equivalent to PK,PK,R).

Data Block: Data grouped into a single machine-accessible entity. A data block is also called a Data Level Block.

Data Level: The collection of data, which may be called a data base, which is retrievable through the index. The data level comprises one or more data blocks.

Index Level: A set of entries in an index or compressed index which have pointers which address another level of the index.

Key: A group of characters, or bits, usually forming a field in a data item, utilized in the identification or location of the item. The key may be part of a record or file, by which it is identified, controlled or sorted. The ordinary meaning in the computer arts is applicable.

Key Byte: A selected character in a key. It is called a K-byte in a compressed key.

Lowest Level: All index blocks which have entries with pointers that address data blocks. The lowest level is also called the Low Level. The "lowest level" or "low level" are distinguished from "lower level" which is a relative term that can apply to any index level except its highest level.

Multilevel Index: An index with a lowest level and one or more high levels.

Search Argument: A known reference word, or argument, used to search for a desired data block in a data base. The desired data block is expected to have a key field identical to the search argument. The acronym SA is used to reference the search argument. Each byte of the search argument is called an A-byte. For example, an employee's name may be an SA for searching for his record in a company file indexed by employee names.

Uncompressed Index: An index as previously defined in which its key's are uncompressed key's.

Uncompressed Key: It has the same meaning as Key. (The reason for adding the descriptor "uncompressed" in this specification is to distinguish the ordinary key, which has an uncompressed form, from its reduced form, which is called herein by the term, compressed key.) It is generally referred to by its acronym UK.

This invention pertains to searching a compressed multilevel index. The compression removes a type of redundancy attributable to the sorted nature of the index, i.e., it removes a sorting induced type of redundancy, and only retains the minimum information needed for searching. The correct searching of a compressed multilevel index involves subtilties and criticalities that are not involved in searching uncompressed multilevel indexes. Recognition of these unobvious characteristics is essential in order to correctly fetch a required record in the next lower level of the index before the correct data record can be fetched.

It is therefore an object of this invention to provide a novel method and system which can search a multilevel index compressed by removal of sorting redundancy and yet be able to fetch the correct next lower level index record.

It is another object of this invention to provide a novel method and system which can search a multilevel compressed index to reduce the number of bytes needed to be machine scanned during a search, when compared to a similar search through a corresponding uncompressed multilevel index. This greatly increases the machine search speed in relation to the speed of searching the sorted uncompressed source index at the same machine byte rate.

It is a further object of this invention to search a compressed index in which the size of multilevel key entries is largely independent of the length of corresponding uncompressed keys. For example, a pointer to a lower level index is accompanied by a pair of compressed keys having only a few bytes which represent an uncompressed key which could have hundreds or thousands of bytes. The amount of index compression is primarily dependent on the "tightness" of the index, that is the amount of variation in the sorted relationship among the uncompressed keys in the index.

More specific objects of this invention are:

A. To search a high-level index having a compressed block format which permits searching by any uncompressed search argument.

B. To search through all index levels by a search argument that is not in the original index of uncompressed keys (UK's) from which the compressed index is constructed, and the search argument would fall between adjacent uncompressed keys represented: (1) within a single compressed index block, or (2) in two compressed index blocks.

C. To search each multilevel compressed index block that is independent of every other compressed block. This avoids having to carry any search information from any higher level block into the key searching operation of a lower level block. The only prior information needed is the address of any block to be searched.

D. To search a multilevel index by entering any index block with a search-equal counter set to zero.

E. To search any high-level block with a format of CK,CK,R for each entry in which R is the pointer, and each CK is a compressed key which may have the form PK. The search may include a lowest index level with a single CK per pointer, described in prior application No. 788,876.

F. To search from the apex of a multilevel compressed index to find a data block in which:

1. only one compressed block is accessed per index level, and
2. the correct data block is found if it was in the original index from which the compressed index was derived, or
3. the search argument is not in the index, and the search indicates a place in the index which is adjacent to where the search argument would have been placed if it had been in the original index.

G. To provide an alternative search entry into the compressed index at the beginning of any level lower than the apex.

H. To be able to make a complete search for a search argument by entering the index at the beginning of any level and proceeding in a serial manner through that level until the correct high key is found, after which only a single block per level may be accessed.

The invention searches each block having a pair of compressed keys per pointer at index levels above the low level. The pair of compressed keys per pointer was generated from the pair of uncompressed keys (UK's) on opposite sides of the boundary represented between adjacent compressed blocks at the lowest index level.

In this invention, the terminology "block" and "record" mean the same in the manner understood in the computing machine programming arts. The blocks in the embodiments can be either physically separated, or they can be different logical blocks in the same physical block.

This invention distinguishes between the searching of the lowest level of a multilevel index, and searching its levels higher than the lowest. The term "low level" will hereafter refer to the lowest level of the multilevel index, and the term "high level" will hereafter refer to any level above the "low level."

With this invention, searched high-level index blocks have a different format than the searched low-level index blocks. The high-level format associates a pair of compressed keys (CK's) with a single pointer, which addresses a next lower-level index block; while the low-level format associates a single CK with each pointer, which addresses a data level block. In the high-level format, the first CK of any pair indicates the index change within the block referenced by the associated pointer, and the second CK of the pair indicates the index change from the last key of the block referenced by the associated pointer to the first key of the following block in the index sequence. Both compressed keys in a pair are required to obtain a correct search with any possible search argument which should retrieve the associated pointer. Thus the first CK of the pair is the first high CK when the search argument falls within the index range of the pointer-addressed index block; and the second CK of the pair is the first high CK when the search argument is low on the last key of the block, or falls between this and the next index blocks. Hence a search argument which falls between two low-level index blocks is related to the block on which end it would be attached on any future updating.

Each high-level or low-level block in the index can be searched independently of any other block. Index block independency is defined as the ability to search any addressed index block without reliance on the result of the search of any other block in the index, excepting a pointer address which might result from a prior search. Block-search independency requires that a search-argument byte equal counter used in the search operation be reinitialized prior to searching any given index block. Reinitializing the equal counter destroys any information it may contain from a prior search.

This search independency allows any index block to be arbitrarily selected with the capability of being searched. Block search independency provides the following features with this invention:

Independency allows any block suspected of having an error condition to be solely selected and checked by search of it with predetermined search arguments.

Independency allows any single block to be selected and updated without effecting any other index block.

Independency allows a complete search of the index to be started at any level of the index, thereby bypassing all higher levels. Such initially entered level can have single or plural numbers of blocks. The number of blocks per level increases exponentially as the index level decreases; only the apex level can have a single block, but the apex level may be designed with plural blocks.

The last-described independency feature also allows search reliability to be increased by permitting any or all higher levels to be bypassed by beginning a search at any desired level.

Independency permits a search of any desired level to progress serially through its sequence of blocks until the correct pointer is found to the next lower level block. If the searched level is a high level, a multilevel search can be initiated with the correct pointer to retrieve the required data block.

Independency obtains flexibility in operating with an index having a fixed number of levels, which may be any number of levels, including a single index level.

Independency permits a binary search of the blocks in any level from a table of pointers (block addresses) for that level. In the table, the pointers are sequenced in the sorted order of the blocks at that level. For example, such a table can be used instead of the apex level of any compressed index. (A practical distinction is that a binary search requires randomly accessible pointers, while any single compressed block requires serial readability.) The binary search first retrieves the pointer in the middle of the table to select the middle block of that index level. If the first key of the middle block is higher than the search argument, its pointer is stored; and then the "first one-half" middle block (in the middle of the first half of the index) is retrieved using the middle pointer in the first half of the pointer table. On the other hand, if the last key of the middle block is high, its pointer is stored; and the "last one-half" middle block addressed by the pointer in the last half of the pointer table is selected. This proceeds with each step narrowing the search by $\frac{1}{2}^n$ blocks at the one level, where $n$ is the number of blocks searched thus far, until the correct pointer is found. The correct pointer can be found within any searched block, and it is indicated by the stored pointer of the block not being its first or last pointer. If a stored pointer is the first or last pointer of any index block, its possible correctness is indicated if the binary search stores the next pointer from the opposite end of the next block; in which case both pointers are stored, and the correct one if determined by verification. Also the binary search ends when there are no more pointers to be selected in the pointer table, in which case, the last readout pointer (first or last) is correct.

The foregoing and other objects, features and advantages of the invention will be apparent from the following more particular description of preferred embodiments of the invention, as illustrated in the accompanying drawings.

FIG. 3 shows a clocking and mode control arrangement;

FIG. 4A illustrates generation mode clock timing, and FIG. 4B shows search mode clock timing for the circuit in FIGS. 9A and 9B;

FIG. 5A illustrates a format for a low-level compressed index block; while FIG. 5B illustrates a format for a high-level compressed index block;

FIGS. 9A and 9B illustrate search mode clock controls used in a search mode version of the invention.

FIGS. 10 and 11 show controls used for generating and searching a compressed index;

FIGS. 15, 16, 17, 18 and 19 provide an embodiment of a multilevel index search control system.

GENERAL

A multilevel index which may be searched by this invention can be generated by the disclosure found in U.S. Pat. application Ser. No. 836,930 filed on the same day as this application and assigned to the same assignee.

Figure 6:
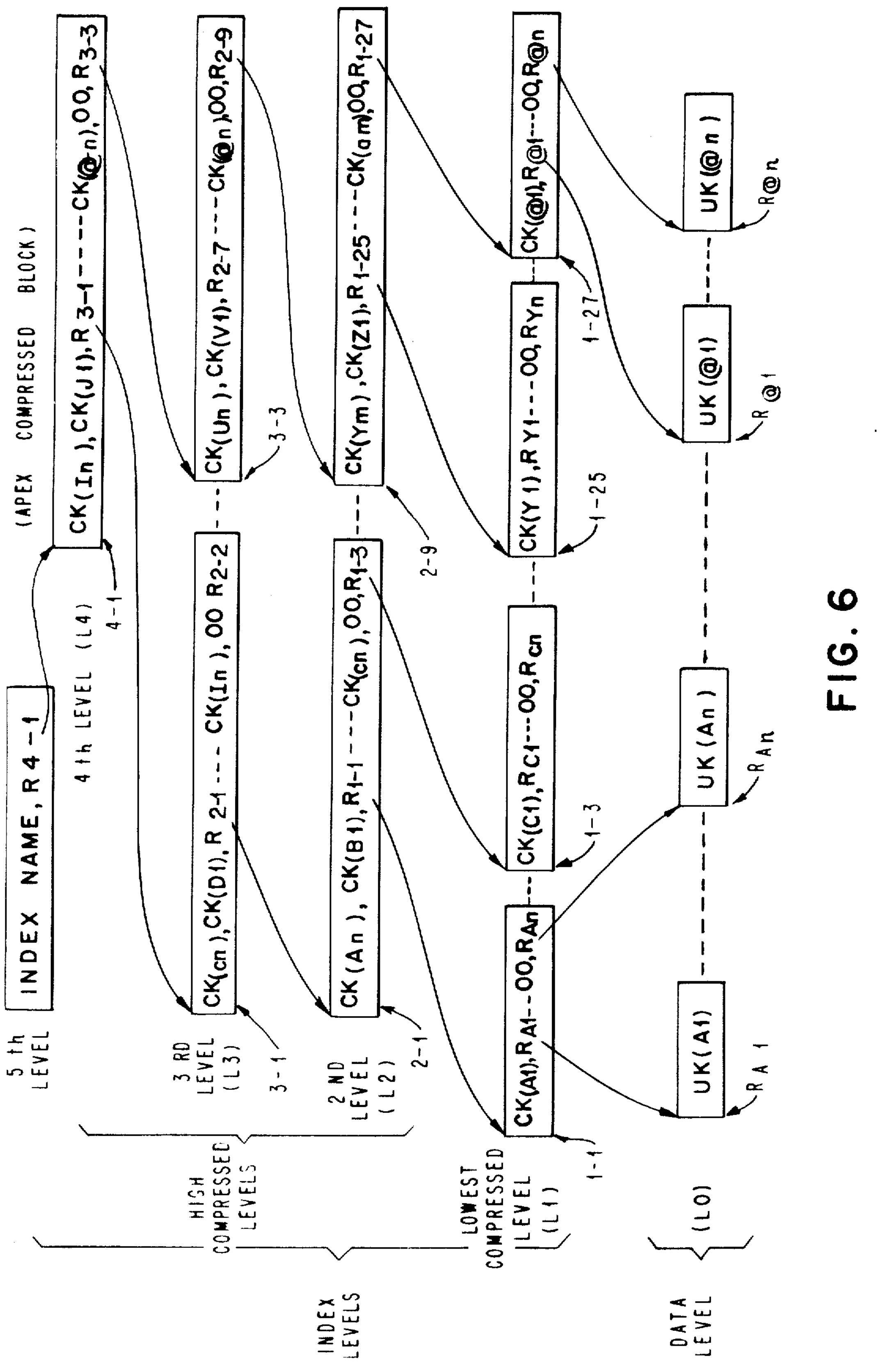
FIG. 6 represents a multilevel compressed index block structure generated according to this invention.

A multilevel index searched by the invention is represented in FIG. 6 by compressed index level L1 through L4. A search retrieves information from data level (L0). The multilevel index includes a compressed low-level index L1, and compressed high-level indexes L2, L3, and L4. A fifth level is not compressed and may be an entry in a conventional computer system catalogue; the entry comprises the name of the L0 data base, and an address (pointer) $R_{4-1}$ which locates the level L4 apex compressed index block 4−1.

The data level L0 comprises a large plurality of blocks of data, each being indexed by its uncompressed key (UK), which includes a first information block having key UK($A_1$) through a last block having key UK($@_n$). The choice of the key for each block is not part of this invention, and it can be the conventional practice of taking any field in a block which is used to index the block. For example, the key may be a field in the block representing an inventory item, man numbers, department number book title, auto license number, etc., with other portions in the block representing information indexed by the key. The blocks at data level L0 may be randomly located where ever there is space on a randomly accessible storage device, such as for example on a magnetic disk drive, a magnetic drum, or strip file device. There is no requirement that the blocks in levels L0–L5 have any rigid positional relationship, sequential or otherwise. Each block may be located at any place where space is available on the device, as long as the block addresses for the available space are provided as an input to this invention. The primary requirement for fast retrieval is that the device be able to quickly access any block when given its respective address.

The blocks in FIG. 6 at level L0 are shown in the order of the sorted sequence of their uncompressed keys, UK ($A_1$) through UK($@n$). This sorted representation is included in the organization of the multilevel indexing structure. However this sorted relationship has no positional relationship to the locations of the data or index blocks on the one or more randomly accessible devices in which the blocks are stored. A desirable consequence of this random-position indexing organization is that it is no longer necessary to move an unchanged block whenever new blocks are added anywhere in its sorting sequence.

It is preferable, although not mandatory, that the highest level have only a single block.

A search for any L0 block using this indexing structure only requires that accessing of one block per indexing level at computer speed, regardless of the number of blocks at any level. Hence in FIG. 6, any required L0 block may be directly retrieved as the sixth block access after five indexing block accesses from level L5 downwardly through levels L4, L3, L2, L1, and L0. The six accesses are not affected by the number of blocks at any of these levels, including data level L0.

The beginning of each index block is located at an address, called a pointer R having two subscript numbers. The first subscript represents the level of the addressed block, and the second subscript represents the sorted position of the addressed block in its particular level. The pointers $R_{3-1}$ through $R_{3-3}$ within level L4 locate the respective blocks 3—1 through 3—3 in level L3. Similarly each of pointers $R_{2-1}$ through $R_{2-9}$ in L3 locates a respective block 2—1 through 2—9 in L2. Likewise the respective pointers $R_{1-1}$ through $R_{1-27}$ in L2 locate the respective blocks 1—1 through 1—27 within L1. Finally each pointer $R_{A1}$ through $R_{@n}$ locates a respective block in the data level L0.

At level L1, each compressed key has a pointer appended to it, such as the first CK ($A_1$) having appended pointer $R_{A1}$ for locating the first L0 block; and each block in level L1 is generated by the compressed index method and means disclosed and claimed in (1) U.S. Pat. application Ser. No. 788,876 filed Jan. 3, 1969 by E. Loizides and J. R. Lyon having the title "Compressed Index Method and Means With Single Control Field," or (2) U.S. Pat. application Ser. No. 788,807 filed Jan. 3, 1969 by W. A. Clark IV, K. A. Salmond and T. S. Stafford titled "Method and Means for Generating Compressed Keys," both applications being assigned to the same assignee as the subject application.

A very large L0 data base can be handled by the indexing structure in FIG. 6. Accordingly the index can handle a very large number of keys for searching among a corresponding number of blocks at level L0. For example the following TABLES B and C represent a compressed index which will accommodate 27,000 separate data blocks within level L0 if each L1 block includes 1,000 compressed keys (CK's), which is a practical number. Table A represents the uncompressed index corresponding to the compressed index in Tables B and C. In another example, if every index block in levels L1–L4 in FIG. 6 is assumed to have 35 pointers per block the four index levels will index up to 1,500,625 data blocks at level L0. Hence it becomes possible to randomly retrieve any of 1,500,625 data blocks with five machine accesses which can be done in less than 1 second using seven different direct access devices (DASD), each having an average access time of less than 200 milliseconds, which is available with current direct access device technology.

In the special case where every index block has C number of keys, and $j$ number of index levels are used, the maximum number of accommodated L0 blocks is $C^j$.

Some examples using four index levels ($j$=4) are:

1. Using 100 pointers per block: 1,010,101 index blocks over the four levels can index a maximum of 100,000,000 data blocks at level L0.
2. Using 1,000 pointers per block 1,001,001,001 index blocks over the four levels can index a maximum of 1,000,000,000,000 (one trillion) data blocks at level L0.

In both examples (1) and (2), five block accesses are required to fetch any L0 data block by starting a search with the highest level block. If CK's are used instead of UK's in each index block, the number of index blocks is reduced when using blocks of the same byte length, or the byte length of the index blocks is reduced when using the same number of index blocks. Thus for one tenth compression using CK's, example (1) could either (a) reduce by one-tenth the number of index blocks having the same byte length for a total of 101,011 index blocks, or (b) reduce by one-tenth the byte length for each of the 1,010,101 blocks. A like compression in example (2) could either (a) use the same byte length to reduce the total number of index blocks to 100,100,101, or (b) reduce by one tenth the byte length of each of the 1,001,001,001 index blocks.

The following Table A illustrates a "Multilevel Uncompressed Index" having four index levels L1–L4 of blocks from which the "Multilevel Compressed Index" in the following Tables B and C is generated:

TABLE A.—MULTILEVEL UNCOMPRESSED INDEX

| L1 | | | L2 | | | L3 | | | L4 | | |
|---|---|---|---|---|---|---|---|---|---|---|---|
| BL. | UKs | PTRs | BL. | UKs | PTRs | BL. | UKs | PTRs | BL. | UKs | PTRs |
| 1-1 | $A_1$<br>$A_n$ | $R_{A1}$<br>$R_{An}$ | 2-1 | $A_n$<br>$B_1$ | $R_{1-1}$ | 3-1 | $C_n$<br>$D_1$ | $R_{2-1}$ | 4-1 | $I_n$<br>$J_1$ | $R_{3-1}$ |
| 1-2 | $B_1$<br>$B_n$ | $R_{B1}$<br>$R_{Bn}$ | | $B_n$<br>$C_1$ | $R_{1-2}$ | | $F_n$<br>$G_1$ | $R_{2-2}$ | | $R_n$<br>$S_1$ | $R_{3-2}$ |
| 1-3 | $C_1$<br>$C_n$ | $R_{C1}$<br>$R_{Cn}$ | | $C_n$<br>$D_1$ | $R_{1-3}$ | | $I_n$<br>$J_1$ | $R_{2-3}$ | | $@_n$<br>END | $R_{3-3}$ |
| | / | | | / | | | // | | | ///<br>End of L4 Index | |
| 1-4 | $D_1$<br>$D_n$ | $R_{D1}$<br>$R_{Dn}$ | 2-2 | $D_n$<br>$E_1$ | $R_{1-4}$ | 3-2 | $L_n$<br>$M_1$ | $R_{2-4}$ | | | |

TABLE A.—MULTILEVEL UNCOMPRESSED INDEX—Continued

| L1 | | | L2 | | | L3 | | | L4 | | |
|---|---|---|---|---|---|---|---|---|---|---|---|
| BL. | UKs | PTRs | BL. | UKs | PTRs | BL. | UKs | PTRs | BL. | UKs | PTRs |
| 1-5 | $E_1$ \| $E_n$ | $R_{E1}$ \| $R_{En}$ | | $E_n$ $F_1$ | $R_{1-5}$ | | $O_n$ $P_1$ | $R_{2-5}$ | | | |
| 1-6 | $F_1$ \| $F_n$ | $R_{F1}$ \| $R_{Fn}$ | | $F_n$ $G_1$ | $R_{1-6}$ | | $R_n$ $S_1$ | $R_{2-6}$ | | | |
| 1-7 | $G_1$ \| $G_n$ | $R_{G1}$ \| $R_{Gn}$ | 2-3 | $G_n$ $H_1$ | $R_{1-7}$ | 3-3 | $U_n$ $V_1$ | $R_{2-7}$ | | | |
| 1-8 | $H_1$ \| $H_n$ | $R_{H1}$ \| $R_{Hn}$ | | $H_n$ $I_1$ | $R_{1-8}$ | | $X_n$ $Y_1$ | $R_{2-8}$ | | | |
| 1-9 | $I_1$ \| $I_n$ | $R_{I1}$ \| $R_{In}$ | | $I_n$ $J_1$ | $R_{1-9}$ | | $@_n$ END | $R_{2-9}$ | | | |
| | | | | | | | End of L3 Index | | | | |
| 1-10 | $J_1$ \| $J_n$ | $R_{J1}$ \| $R_{Jn}$ | 2-4 | $J_n$ $K_1$ | $R_{1-10}$ | | | | | | |
| 1-11 | $K_1$ \| $K_n$ | $R_{K1}$ \| $R_{Kn}$ | | $K_n$ $L_1$ | $R_{1-11}$ | | | | | | |
| 1-12 | $L_1$ \| $L_n$ | $R_{L1}$ \| $R_{Ln}$ | | $L_n$ $M_1$ | $R_{1-12}$ | | | | | | |
| 1-13 | $M_1$ \| $M_n$ | $R_{M1}$ \| $R_{Mn}$ | 2-5 | $M_n$ $N_1$ | $R_{1-13}$ | | | | | | |
| 1-14 | $N_1$ \| $N_n$ | $R_{N1}$ \| $R_{Nn}$ | | $N_n$ $O_1$ | $R_{1-14}$ | | | | | | |
| 1-15 | $O_1$ \| $O_n$ | $R_{O1}$ \| $R_{On}$ | | $O_n$ $P_1$ | $R_{1-15}$ | | | | | | |
| 1-16 | $P_1$ \| $P_n$ | $R_{P1}$ \| $R_{Pn}$ | 2-6 | $P_n$ $Q_1$ | $R_{1-16}$ | | | | | | |
| 1-17 | $Q_1$ \| $Q_n$ | $RR_{Q1}$ \| $R_{Qn}$ | | $Q_n$ $R_1$ | $R_{1-17}$ | | | | | | |
| 1-18 | $R_1$ \| $R_n$ | $R_{R1}$ \| $R_{Rn}$ | | $R_n$ $S_1$ | $R_{1-18}$ | | | | | | |
| 1-19 | $S_1$ \| $S_n$ | $R_{S1}$ \| $R_{Sn}$ | 2-7 | $S_n$ $T_1$ | $R_{1-19}$ | | | | | | |
| 1-20 | $T_1$ \| $T_n$ | $R_{T1}$ \| $R_{Tn}$ | | $T_n$ $U_1$ | $R_{1-20}$ | | | | | | |
| 1-21 | $U_1$ \| $U_n$ | $R_{U1}$ \| $R_{Un}$ | | $U_n$ $V_1$ | $R_{1-21}$ | | | | | | |
| 1-22 | $V_1$ \| $V_n$ | $R_{V1}$ \| $R_{Vn}$ | 2-8 | $V_n$ $W_1$ | $R_{1-22}$ | | | | | | |
| 1-23 | $W_1$ \| $W_n$ | $R_{W1}$ \| $R_{Wn}$ | | $W_n$ $X_1$ | $R_{1-23}$ | | | | | | |
| 1-24 | $X_1$ \| $X_n$ | $R_{X1}$ \| $R_{Xn}$ | | $X_n$ $Y_1$ | $R_{1-24}$ | | | | | | |
| 1-25 | $Y_1$ \| $Y_n$ | $R_{Y1}$ \| $R_{Yn}$ | 2-9 | $Y_n$ $Z_1$ | $R_{1-25}$ | | | | | | |
| 1-26 | $Z_1$ \| $Z_n$ | $R_{Z1}$ \| $R_{Zn}$ | | $Z_n$ $@_1$ | $R_{1-26}$ | | | | | | |
| 1-27 | $@_1$ \| $@_n$ | $R_{@1}$ \| $R_{@n}$ | | $@_n$ END | $R_{1-27}$ | | | | | | |
| | End of L1 Index | | | End of L2 Index | | | | | | | |

TABLE B.—MULTILEVEL COMPRESSED INDEX

| L1 | | | L2 | | | |
|---|---|---|---|---|---|---|
| BL. | CKs | PTRs | BL. | CKs | | PTRs |
| 1-1 | CK($A_1$) | $R_{A1}$ | 2-1 | CK($A_n$) | CK($B_1$) | $R_{1-1}$ |
| | 00 | $R_{An}$ | | CK($B_n$) | CK($C_1$) | $R_{1-2}$ |
| | ------------ | ------------ | | CK($C_n$) | 00 | $R_{1-3}$ |
| 1-2 | CK($B_1$) | $R_{B1}$ | | ---------/--------- | | |
| | 00 | $R_{Bn}$ | | | | |
| | ------------ | ------------ | | | | |
| 1-3 | CK($C_1$) | $R_{C1}$ | | | | |
| | 00 | $R_{Cn}$ | | | | |
| | ------/------ | | | | | |
| | ------------ | ------------ | | ------------ | | |
| 1-25 | CK($Y_1$) | $R_{Y1}$ | 2-9 | CK($Y_n$) | CK($Z_1$) | $R_{1-25}$ |
| | 00 | $R_{Yn}$ | | CK($Z_n$) | CK(@$_1$) | $R_{1-26}$ |
| | ------------ | ------------ | | CK(@$_n$) | 00 | $R_{1-27}$ |
| 1-26 | CK($Z_1$) | $R_{Z1}$ | | ---------/--------- | | |
| | 00 | $R_{Zn}$ | | | | |
| | ------------ | ------------ | | | | |
| 1-27 | CK(@$_1$) | R@$_1$ | | | | |
| | 00 | R@$_n$ | | | | |
| | ------///------ | | | | | |

TABLE C.—MULTILEVEL COMPRESSED INDEX

| L3 | | | | L4 | | | |
|---|---|---|---|---|---|---|---|
| BL. | CKs | | PTRs | BL. | CKs | | PTRs |
| 3-1 | CK($C_n$) | CK($D_1$) | $R_{2-1}$ | 4-1 | CK($I_n$) | CK($J_1$) | $R_{3-1}$ |
| | CK($F_n$) | CK($G_1$) | $R_{2-2}$ | | CK($R_n$) | CK($S_1$) | $R_{3-2}$ |
| | CK($I_n$) | 00 | $R_{2-3}$ | | CK(@$_n$) | 00 | $R_{3-3}$ |
| | --------//-------- | | | | --------///-------- | | |
| | --------//-------- | | | | | | |
| 3-3 | CK($U_n$) | CK($V_1$) | $R_{2-7}$ | | | | |
| | CK($X_n$) | CK($Y_1$) | $R_{2-8}$ | | | | |
| | CK(@$_n$) | 00 | $R_{2-9}$ | | | | |
| | --------//-------- | | | | | | |

Table A, column L1, illustrates the lowest index level L1 blocks of uncompressed keys (UK's) obtained from the key fields of the information blocks at data level L0. The level L0 information blocks need not be located in any particular order, and are assumed to have random locations. The keys are taken from any field within the L0 information blocks required for indexing. After the L0 block keys are obtained, they are sorted and blocked to generate the L1 UK block sequence, such as in column L1, by programming or hardware means known in the art and not part of this invention. Hence the UK's and their blocks are in sorted sequence in column L1, and they are stored in a form which can provide the input to the Generate Mode of this invention.

For example, the UK's and their pointers may be stored on a tape I/O device in a sequential manner, such as the 27 sequential blocks 1—1 through 1—27 in Table A, column L1. These UK blocks are respectively used by this invention to generate uncompressed key blocks 2—1 through 2—9 shown in column L2 of Table A. The UK blocks in column L2 are then used to generate the UK blocks in column L3, etc., until the highest level L4 is generated, which comprises a single UK block.

Accordingly in previously cited application Ser. No. 836,930 each current level of UK blocks is used to generate the next higher level of UK blocks. Furthermore, while generating the next higher UK block level, the detailed embodiment herein also compresses the keys at current UK level.

The length of the UK blocks at any level is determined by the size required for the blocks at that level. The boundary at the end of each block in Table A, in column L1, is represented by dashed lines (-----), and some dashed lines have one or more intersecting slash lines (/) to represent the significance of the boundary at higher levels. All level L2 block boundaries in Table A are identified by symbol ----/---, all L3 block boundaries by symbol ---//---, and all L4 block boundary by symbol --///---. The use of these higher level boundaries as L1 boundaries indicates their level of significance.

The UK's on opposite sides of each end boundary are significant in the generation of the higher level compressed keys; they are called "boundary UK's." Hence each block-end boundary is represented by a pair of "boundary UK's."

The second level (L2) UK sequence represented in column L2 of Table A comprises all "boundary UK's" in the L1 block sequence.

The third level (L3) UK sequence represented in column L3 in Table A comprises the last pair of UK's in each UK block in the level L2 sequence. The last level (L4) in the example of Table A comprises the last pair of UK's in each UK block in the level L3 sequence.

Certain L1 "boundary UK's" are the last pair of UK's at the end of each block at all every higher level. Thus at level L1, every third boundary identifies a pair of "boundary UK's" used to end each block at level L2, every ninth L1 boundary defines "boundary UK's" used to end each block at level L3, and the last (27th L1 boundary defines the boundary UK's used to end the highest level block at level L4. Thus the "-boundary UK's" ending the high-level block also ends the last block at every lower "high level" above L1), and it also represents the last "boundary UK's" at low level L1.

The number of UK's in each high level (L2 and higher) is assumed to be six in the example of Table A. Each high level pair of UK's and a pointer generates two corresponding CK's with the same pointer found in Tables B and C.

In practice, a large number of pointers, each with a pair of CK's, may be provided in any block. The size of the block is in practice determined by the user of the invention, and it will be dependent upon the type of storage that is available for the multilevel index, and the required speed of search.

The size of a compressed block is directly related to the speed of search, since any single block is searched sequentially from its beginning. Hence the shorter the block, the less the search time through a block. It is seldom necessary to search to the end of any given block, since the search ends as soon as the search argument is low with respect to any compressed key in a block. A good rule of thumb for determining average search time per block is the time required to scan one-half a block. The search technique may use the method and means described and claimed in the previously cited applications having Ser. Nos. 788,876, or 788,835.

The number of blocks sequentially scanned by a search argument generally is equal to the number of levels in the multilevel index. Thus the search speed is independent of the number of blocks in any given level. Other factors in determining the practical size of the multilevel blocks is the efficiency in utilization of storage space on particular I/O devices in which blocks may be stored, and their access time thereon.

Although equal size blocks are shown for all high levels in Table A, this is a special case. The block size in number of compressed keys per block may be represented by $C_1, C_2.....C_j$ at respective levels 1, 2......$j$, where $j$ is the highest level. C/2 represents the number of pointers in a high-level index block, where high-level is L2 or higher. C/2 also is the number of next lower level blocks indexed by this same block. $C_1$ represents the number of pointers in an L1 block.

$K_1, K_2.....K_j$ represent the number of blocks at the respective subscript levels. The number K of blocks decreases exponentially as the level number increase. Hence the total number of blocks in an index is $K_1+K_2.....+K_j$. Hence this set of numbers decreases from $K_1$ to $K_j$. At the lowest level L1 only one CK per pointer is used, and $K_0=K_1\times C_1$.

In the special case where the number of pointers (R) per block is equal for all index levels, and $K_j=1$, then $C=K_0/K_1=K_1/K_2=....=K_{j-1}$. This special case is represented in Table A. The total number of L0 data blocks handled by this special case is $R^j$.

Tables B and C show the four levels of the "Multilevel Compressed Index" which is derived from the "Multilevel Uncompressed Index" shown in Table A. Tables B and C have the same number of blocks as in Table A, but each block in Tables B and C is much smaller because of the unique index compression. Accordingly, there is a one-for-one relationship between the respective blocks in the compressed and uncompressed indexes.

Figures 1A, 1B:
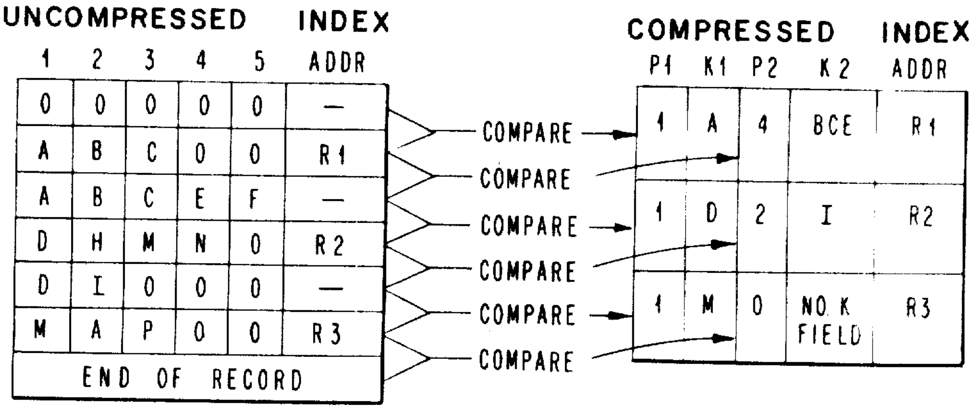
FIG. 1A illustrates an uncompressed high-level index.
FIG. 1B illustrates the compressed high-level index derived therefrom.

FIG. 1B shows a high-level compressed index block generated from the uncompressed keys having an ascending sort relationship shown in respective five byte word positions in FIG. 1A. (Specific examples of the generation of these compressed entries in FIG. 1B from the UK's in FIG. 1A is found in application Ser. No. 836,930.) The high-level index entry format in FIG. 1B is CK, CK, R for each of the three illustrated index entries. That is, in each entry, the P1 and K1 fields contain the first CK of an entry, and the P2 and K2 fields contain the second CK of the entry, which is followed by the pointer R. Thus each UK shown on a horizontal line in FIG. 1A has a true index representation in FIG. 1B.

A search argument (SA) is any uncompressed key used to search the compressed index in FIG. 1B. However, only SA's which are one of the UK's in FIG. 1A, i.e., used in generating the compressed index in FIG. 1B, will have a true representation in the compressed index. The UK's in FIG. 1A are ABC, ABCEF, DHMN, DI, and MAP; they are left-byte justified, and any unused bytes positions to their left in each five byte word area are padded with null bytes shown as zeros in FIG. 1A. Any SA corresponding to a UK, which is not represented in the generation of the compressed index, may also be used to search the compressed index; but the search will find the SA is not represented in the index after verification is attempted on the key field in the data record found by the search.

The rules of searching compressed keys at the low level, as disclosed in prior filed application Ser. No. 788,876, are used in this application to search compressed keys at the high levels of a multilevel index.

For example, suppose the search argument (SA) is DHMN. Like the low-level search in application Ser. No. 788,786, the high-level search likewise uses a tool called an equal counter (item 301 in FIG. 13) which initially is set to the first byte position of the SA. At any time during the search, the equal counter setting represents the number of bytes in the SA which have been found to be equal to bytes found in the K1 and K2 fields of compressed keys in a block being searched.

A search begins by entering the first CK at the top of FIG. 1B and finds its byte P1 contains a 1 which is equal to the initial setting of the equal counter. This equality causes the first byte of the search argument, which is D, to be compared with the K1 byte, which contains an A. An unequal comparison occurs between A and D, in which the K-byte is lower than the search argument byte (called an A-byte). This lower-than condition for the K-byte causes the search to continue by going to the next CK comprising bytes P2 and K2. Byte P2 contains a 4, and it is compared to the current setting of the equal counter, which is still 1. Whenever P is greater than the equal counter setting, the search continues by immediately going to the next CK, thereby skipping the remaining bytes in the first entry which include the K2 bytes BCE and the pointer R1. Then the P1 field of the second entry in FIG. 1B is read and that P1 byte is a 1. It equals the current setting of the equal counter, and therefore its K1 byte, which is D, is selected. This K-byte is compared to the current A-byte, which still is the first byte, D, of the SA. Now the K-byte is equal to the A-byte, and therefore the equal counter setting is incremented by 1 so that it has a new value of 2. Since no more K-bytes exist in that CK, the next CK is entered.

The next CK has a P value of 2, and it compares equal to the current equal counter setting. As a result, the K-byte, which is I, is selected and compared with the A-byte at the current equal counter setting of 2, which is H. The comparison of H and I finds the K-byte is greater than the argument byte, which is an ending condition for the search, i.e., this is the first K-byte to compare high with an A-byte during the search. Hence the second CK of the second entry may be called the first-high CK during a search by the search argument DHMN. It is not important that bytes M and N of the search argument have not been examined here. The pointer R2 with the entry having the first-high CK is then readout to complete the search of the high-level index in FIG. 1B. No other entries in FIG. 1B need be read. The readout pointer R2 addresses a next lower level index block which must be obtained to continue the search through the multilevel index. The search of the lower level block proceeds in the same manner as described for FIG. 1B with the same search argument DHMN, after the equal counter is reinitialized back to the setting of 1.

This example of searching the high-level compressed index block in FIG. 1B is applicable regardless of which block it may be in a multilevel index. For example, it could be apex block 4—1 in FIG. 6, in which case it would be the first block entered in making a multilevel search. After exiting from the apex block when pointer R2 is readout, the pointer is used to obtain the next lower level index block from level L3, which is read into the storage area to overlay the block shown in FIG. 1B, which may be storage area 10 in FIG. 2B; a block from level L3 also is a high-level compressed block, and it is searched in the same manner as the apex block, using the same search argument. A pointer will be found in the L3 block to an L2 block, etc., and a chained sequence of blocks will be found with the same SA until a lowest level block is found which is searched as described in application Ser. No. 788,876, using the same search rules as described herein for FIG. 1B but only having one CK per index entry instead of the two CK's per index entry found in the high levels.

A one-level search begins with the first block in the sequence for any level. For example, the block in FIG. 1B may be the first block 3—1. Suppose a one-level search is looking for a search argument SURF. The search will occur similarly to that described above. Beginning with the first block shown in FIG. 1B, the first CK, which is 1A, is entered. The P-byte and equal counter setting are equal, and the K-byte (which is A) is less than the first A-byte, S; and the second CK, 4BCE, is entered. Its P-byte 4 is greater than the current equal count of 1; and the next CK, which is 1D, is entered. Equality again is found between the P-byte and the equal counter setting; but again the K-byte (which is D) is less than the A-byte (which is S); and the search goes to the next CK, which is 2I. The P-byte, 2, is compared to the equal counter setting, which is still 1, and since the equal counter setting is greater than the P-byte value, the search skips to the next CK, which is 1M and is the first CK in the last entry of the block. Since the equal counter setting again equals the P-byte, 1, a comparison is made of the A-byte, S, and K-byte, M. The K-byte is again low, and the search goes to the last CK in the last entry of the block, which has a P-byte of 0 to indicate an end of block condition. The block's last pointer R3 is then readout and stored in any retrievable place.

In this a one-level search, the next sequential block 3—2 at the same level (L3) is obtained and entered for searching with the same argument, SURF.

Suppose that block 3—2 has the compressed entries listed below which were derived from the UK's listed below. (The UK's are not available during the search).

| UK's | ADDR | Compressed Entries |
|---|---|---|
| Nottingham | R4 | 1N, 1P, R4 |
| PERSERVERENCE | | 1S, 1T, R5 |
| SURF | R5 | ----- |
| TURNABOUT | | ----- |
| ----- | | |
| ----- | | |

The equal counter is reset to 1, and the first CK, which is, 1N, in the first entry is read. The K-byte, N, is found less than the first A-byte, S. Thus the next CK, 1P, is entered with similar result; i.e., K-byte, P is less than A-byte, S. Hence the next index entry is entered, and its first CK, which is 1S, is also found to have equal counter and P-byte equality. Then its K-byte is compared to the A-byte which here are found to be equal. This is not an ending condition for the search, and accordingly the next CK (which is 1T) is entered. However, its K-byte, T, is greater than A-byte, S; and this is a first-high K-byte which is a search ending condition, so that pointer R5 is read out. (The above UK list for block 3—2 shows that pointer R5 represents the UK which is SURF, that is identical to the SA.)

An index block in the next lower level is located by R5; and it is retrieved and searched with the same search argument SURF after the equal counter is reset to 1. Hence the one-level search at level L3 is completed, and the search thereafter continues through the lower levels on a multilevel basis next going to the block located by pointer R5 in the next lower level, L2, etc., until a data block is found in level L0.

An example of a binary one-level search is similar to the sequential one-level search described above, except that index block selection at the one level is in binary order instead of in the sequential order described above. Hence the binary search first enters the middle block in the sequence at the one level instead of initially entering the first sequential block.

Figure 2A:
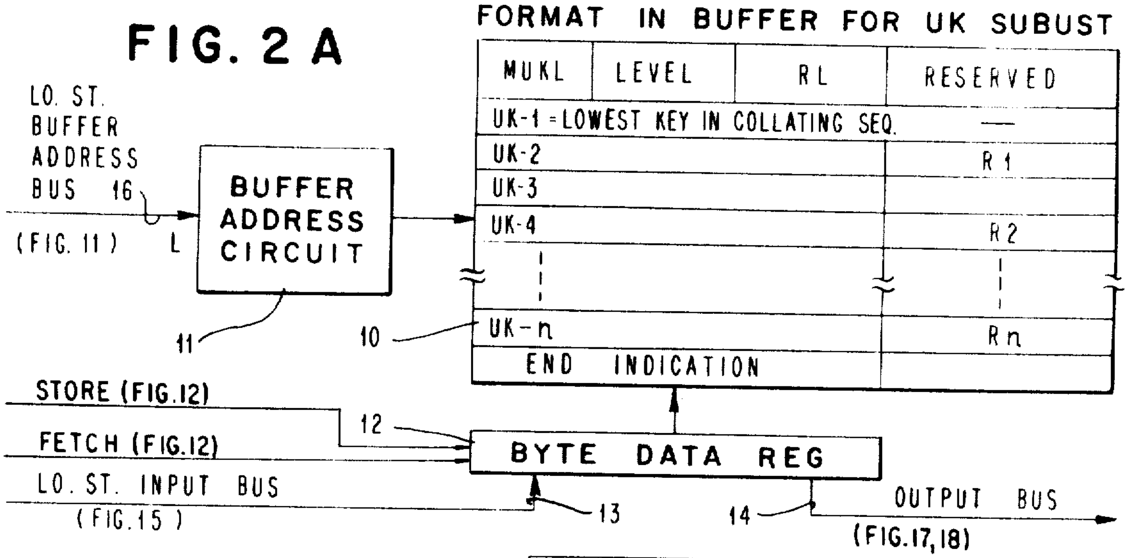
FIGS. 2A and 2B illustrate a buffer and input-output circuits used for storing an uncompressed high-level index and the resulting compressed index respectively.

FIG. 2A shows a storage area holding a set of UK's, such as is shown in FIG. 1A, which may be used in the generation of a high-level block. FIG. 2A represents the UK's in a more general manner, such as UK—1, UK—2, UK—3, etc.

Figure 2B:
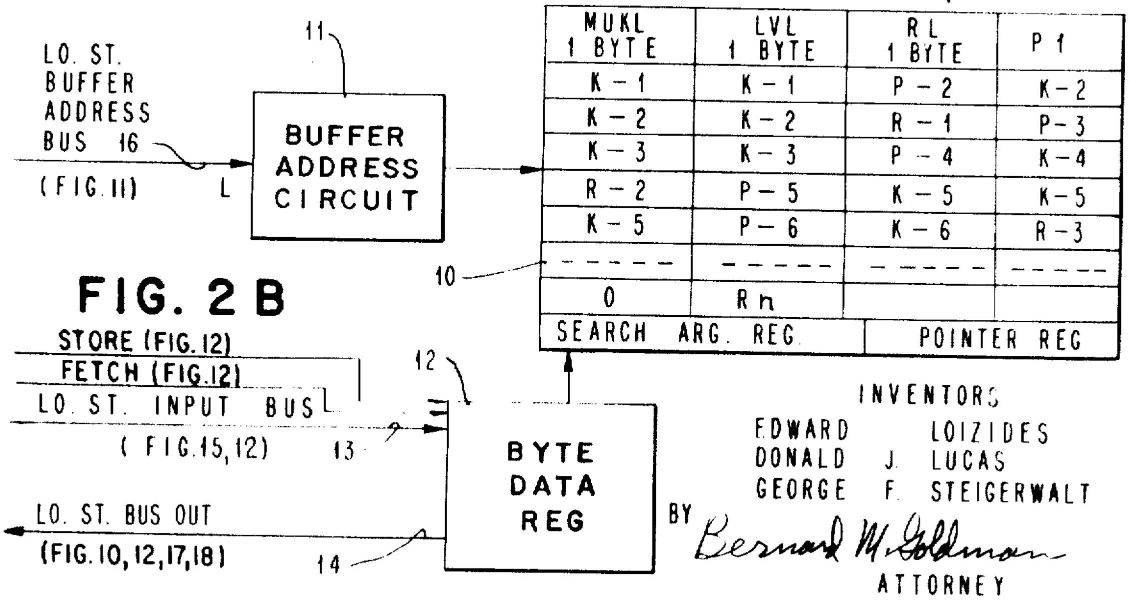

FIG. 2B shows a storage area holding a block of compressed entries, such as shown in FIG. 1B. FIG. 2B shows the CK's in a more general manner than in FIG. 1B. The storage area in FIGS. 2A and B can, if required, be the same storage area used at different times, where the CK's in FIG. 2B overlays the UK's in FIG. 2A during the compression process.

Figure 7A:
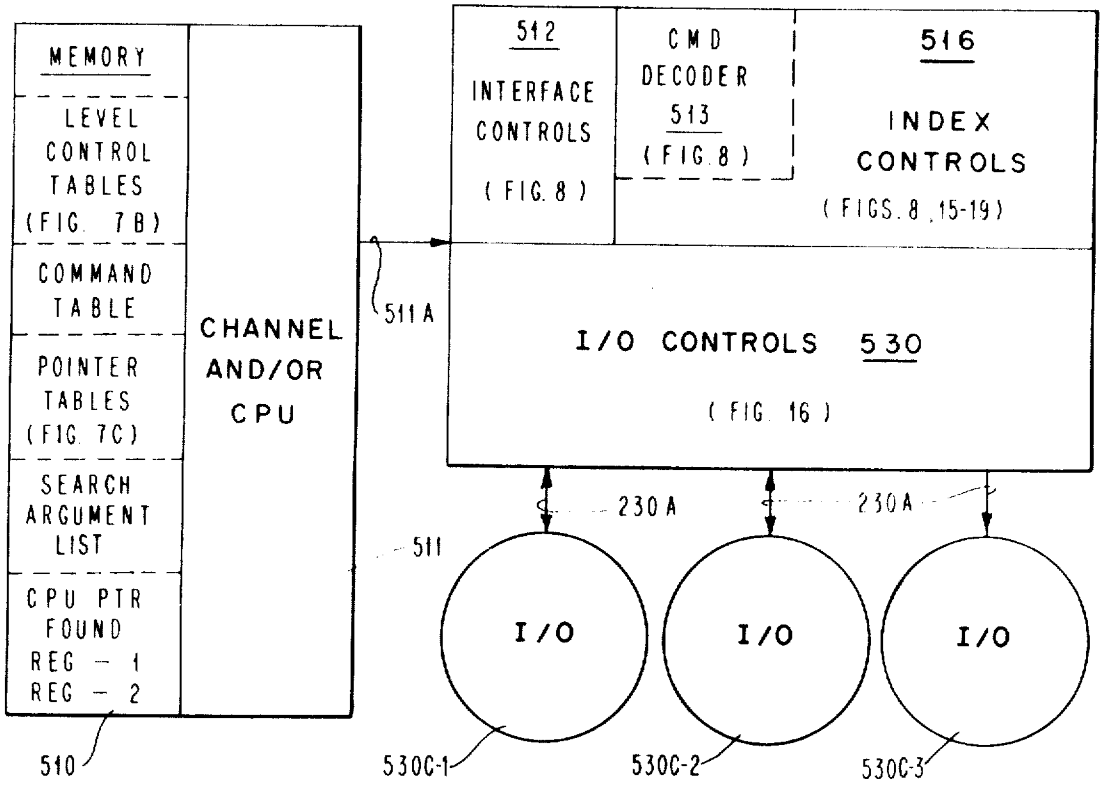
FIG. 7A illustrates an overview of a computer system which contains the invention; and 7B and 7C illustrates tables used by the embodiments.

FIG. 7A provides an overview of the environment for an embodiment of the invention, which has its steps largely executed by index controls 516. It includes a channel and/or CPU 511 which connects a memory 510 via transmission and control lines 511A to interface controls 512 and to I/O controls 530. I/O controls 530 connect to a plurality of I/O devices 530C—1, 530C—2 and 530—3. Devices 530C have stored thereon the multilevel compressed index. More than one I/O device is required only when the compressed index requires more storage capacity than is obtainable from a single device. In this sense, reference number 530C is representative of any required number of devices upon which the index is stored. Each device 530C preferably has fast random access capability on a per block basis, and it may be one or more magnetic disks, magnetic drums, or magnetic strip files.

Figure 14A:
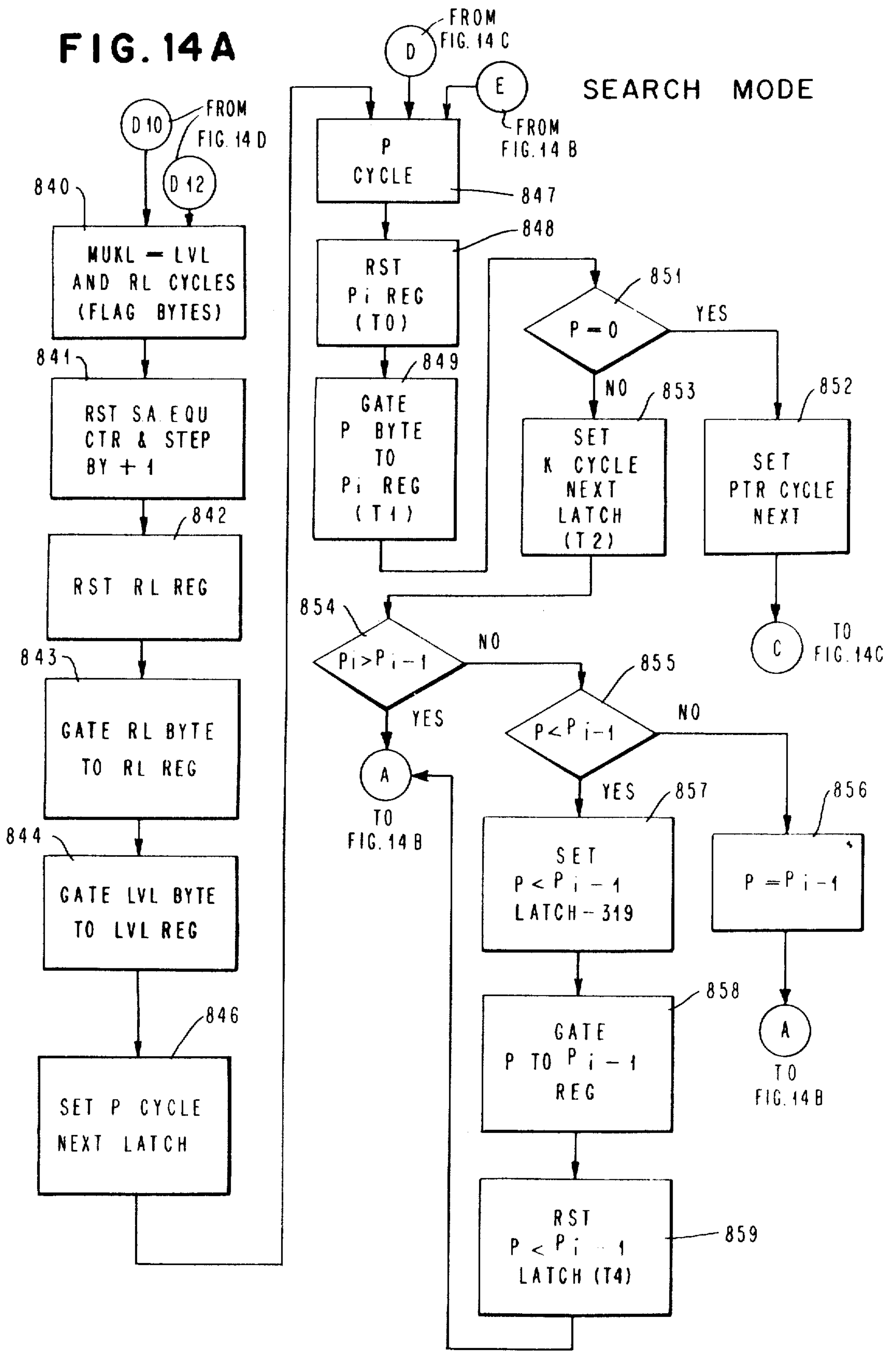
FIGS. 14A, 14B, 14C, 14D, 14E, 14F and 14G illustrate a search method embodiment of this invention.
Figure 14B:
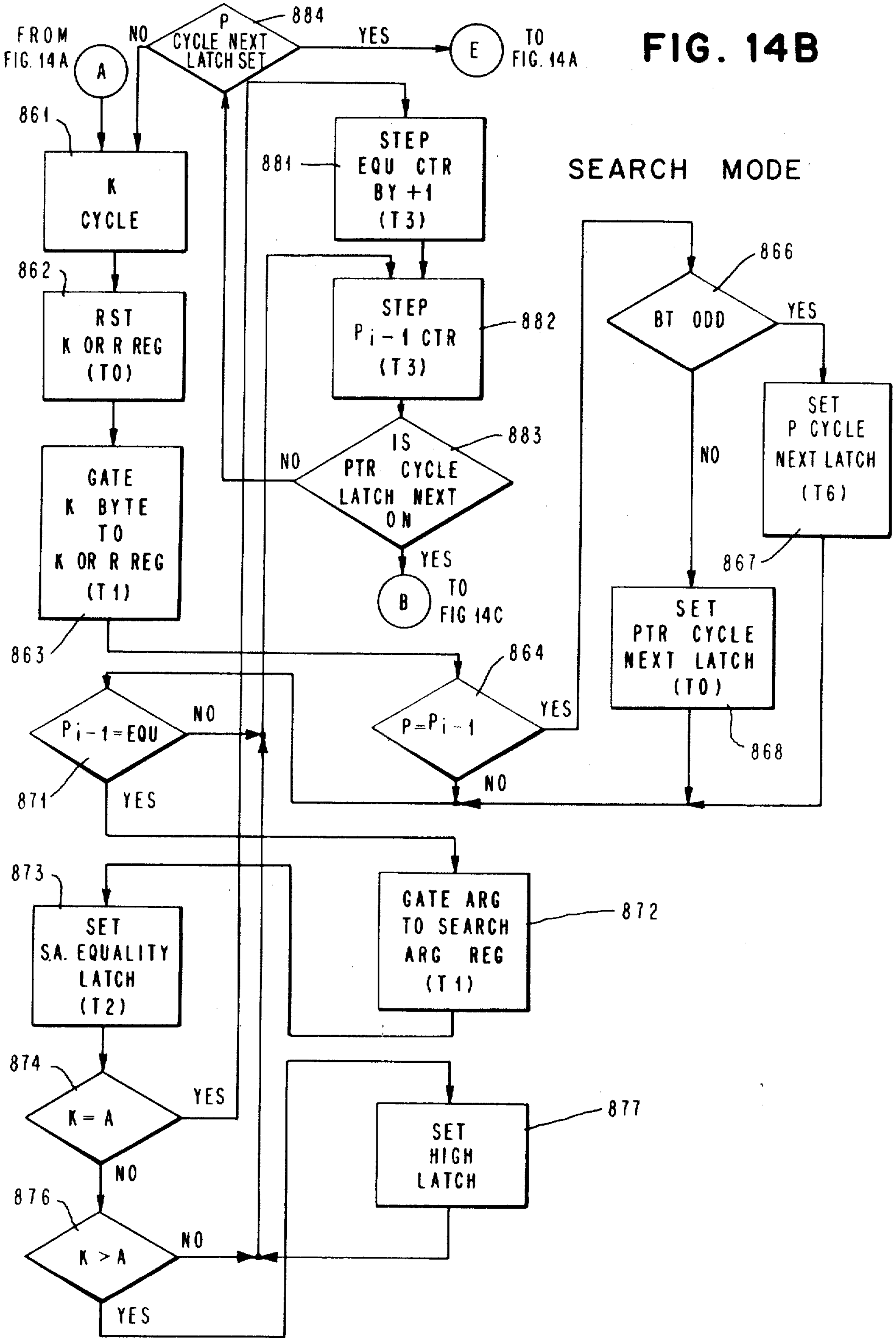
Figure 14C:
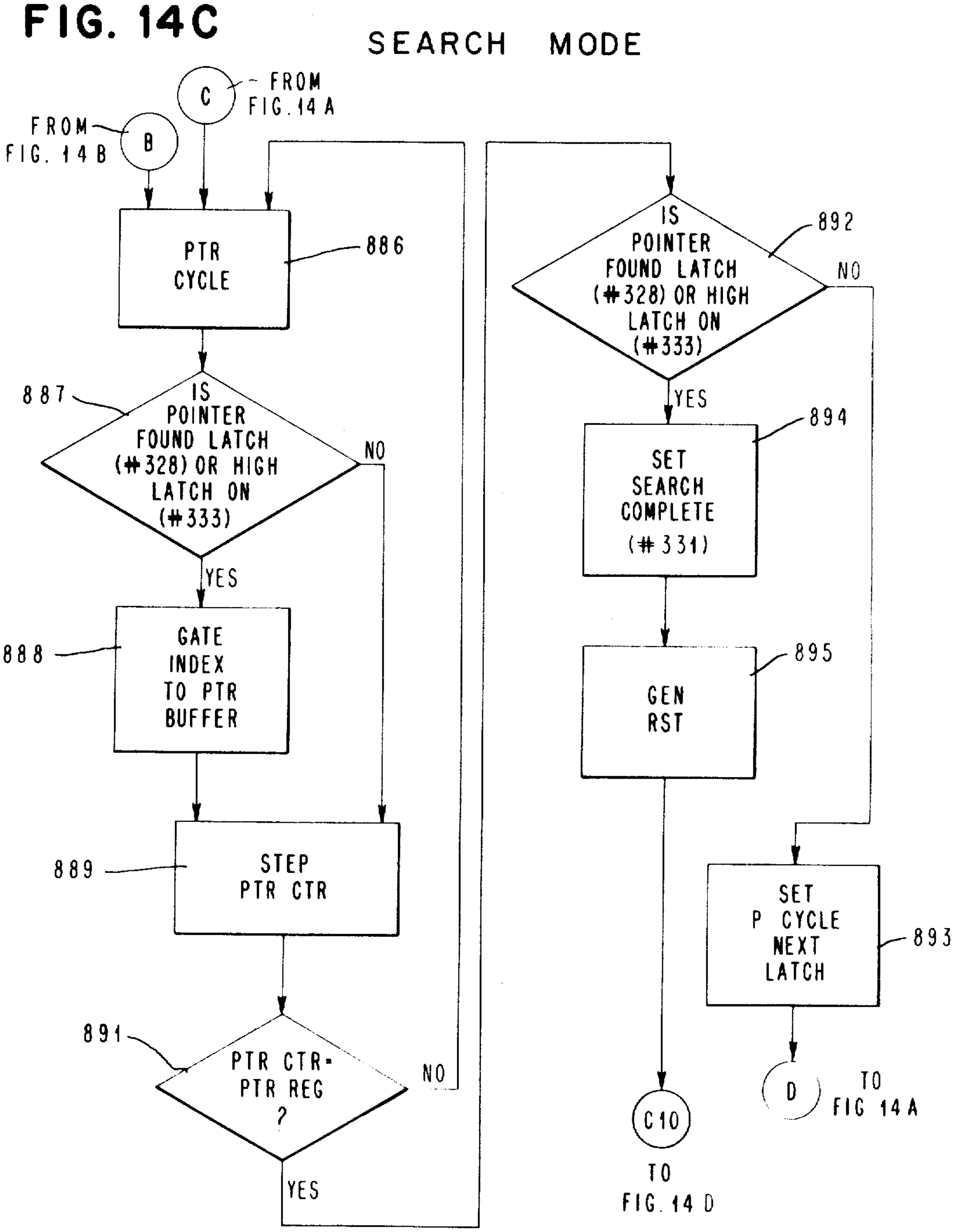
Figure 14D:
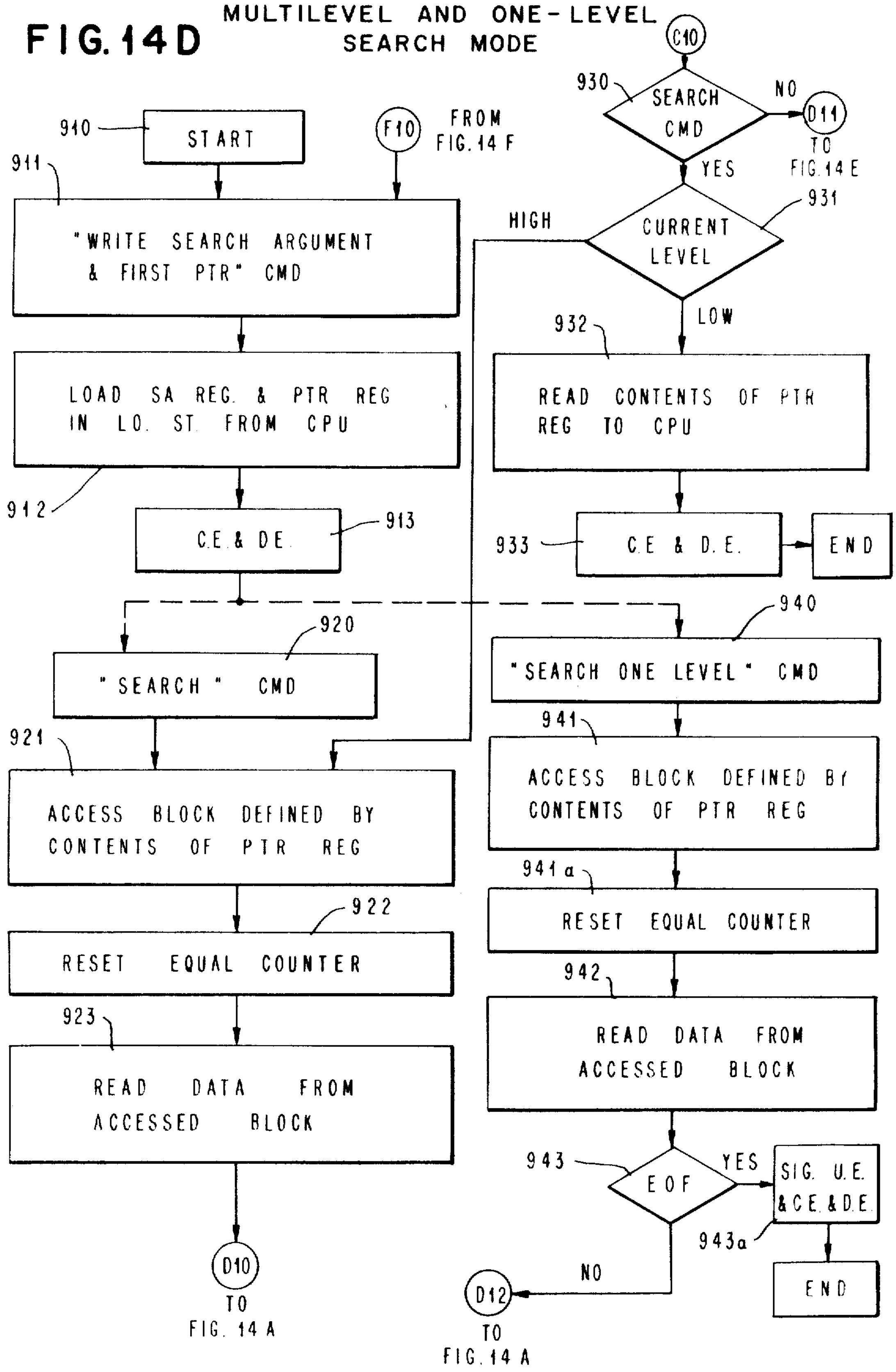

Hence prior to the start of any method in FIG. 14D, it is required that I/O device(s) 530C contain the multilevel index of compressed blocks, and that memory 510 be loaded with the required command table having commands decodable by command decoder 513 in FIG. 7A.

Figure 7B:
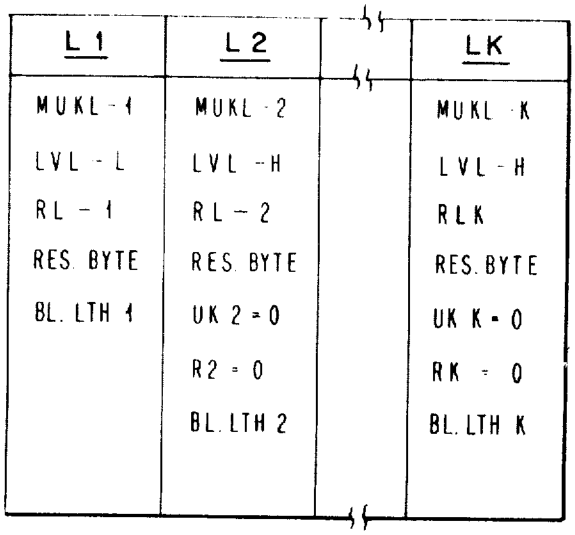
Figure 7C:
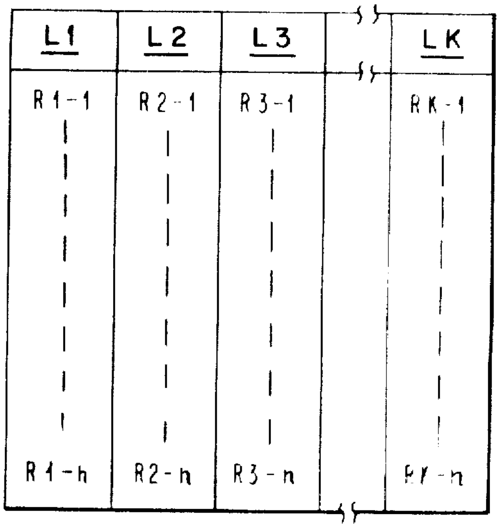

Before starting a one-level search, it is also required that memory 510 be loaded with the pointer tables shown in FIG. 7C.

FIG. 7B shows level control tables which include initialization parameters needed to operate at each of the different levels. Thus each level, L1, L2, etc., contains the parameters for the first four bytes, MUKL, LVL, RL, and RES.BYTE which initially are loaded into the storage areas shown in FIGS. 2A and 2B prior to operating at the respective level. The block length for a level is BL.LTH, and the first null UK and pointer are the UK=0 and R=0 for each level.

Figures 3, 4A, 4B, 5A, 5B:
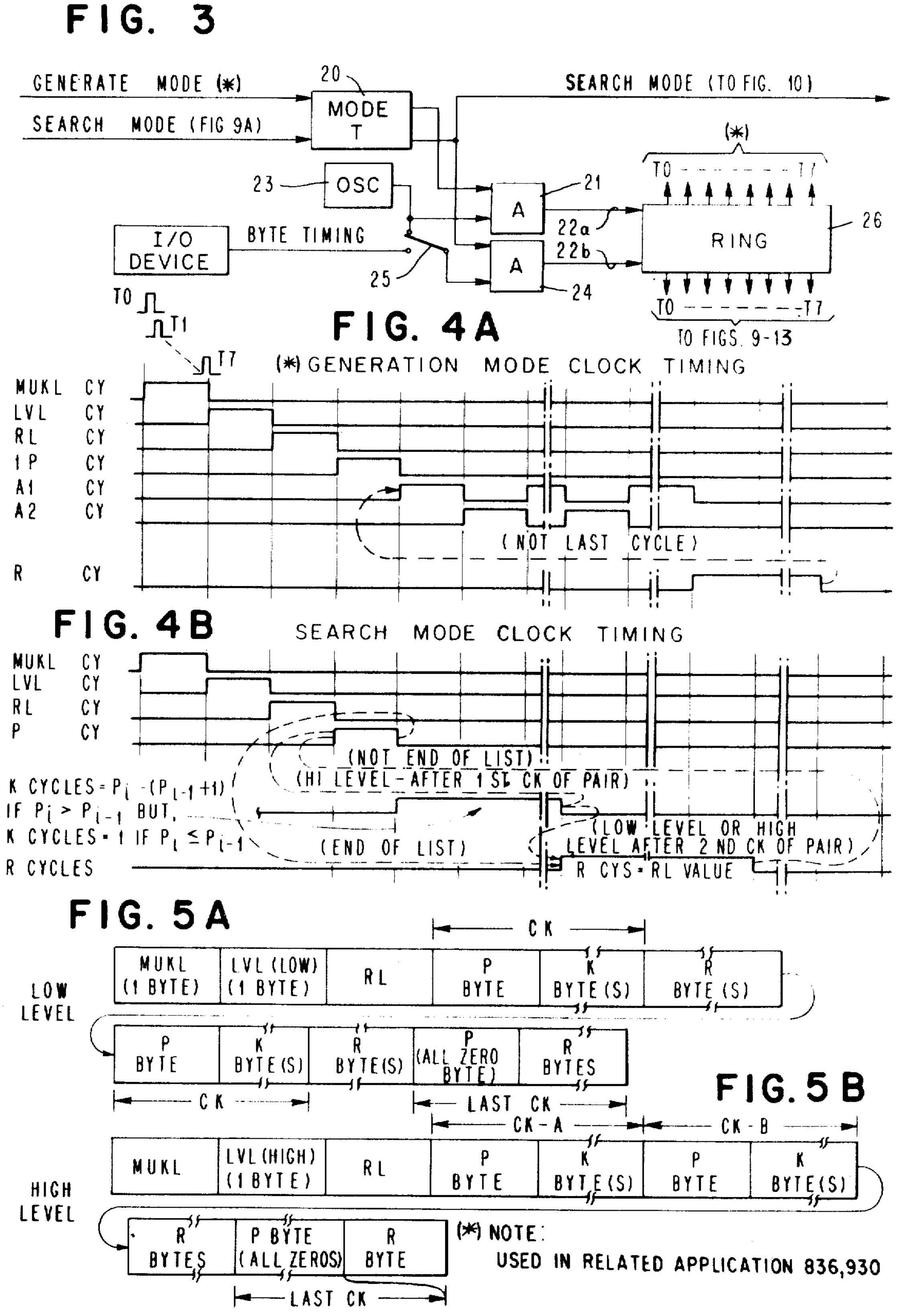
Figure 9B:
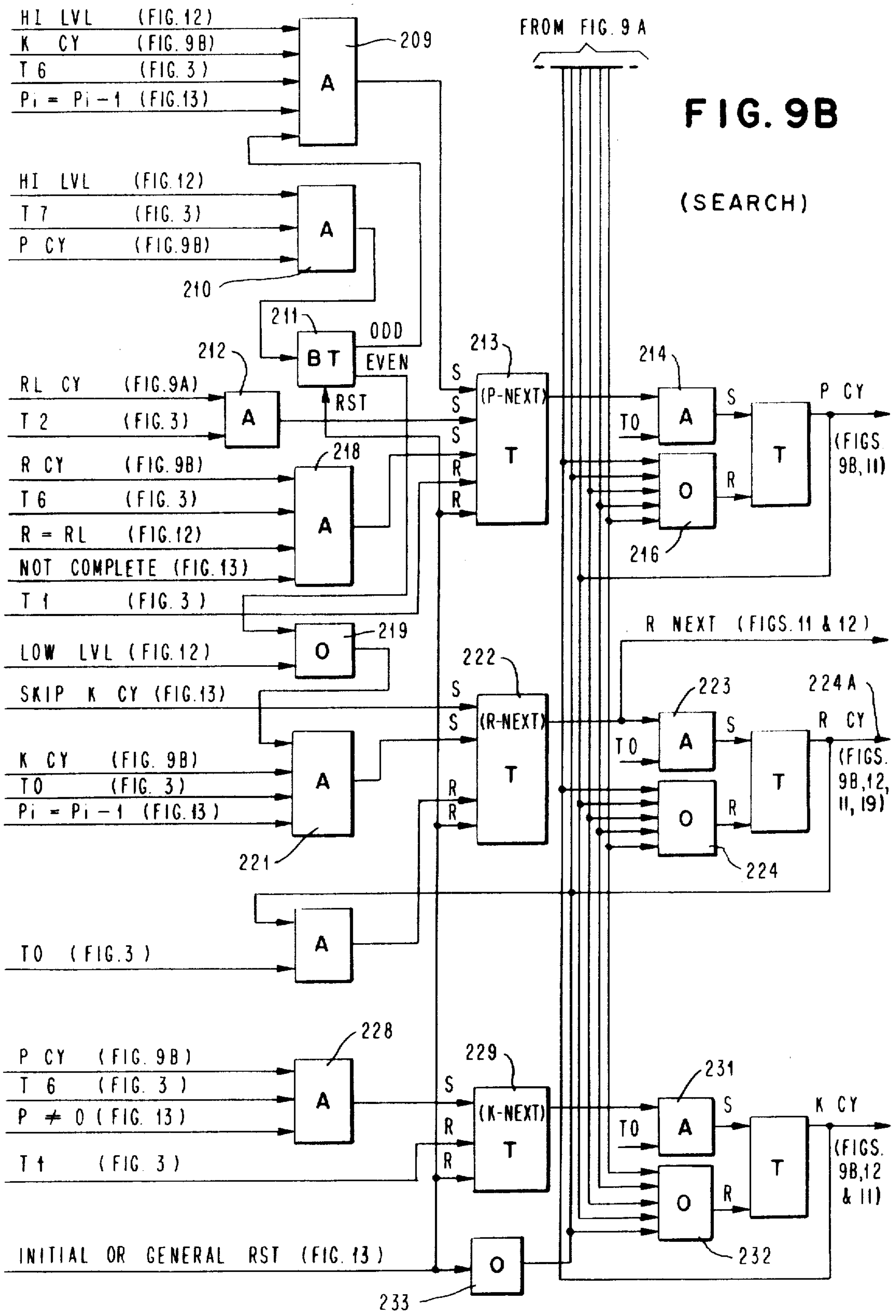

The MODE and timing circuits shown in FIG. 3 can control the operation of the hardware embodiment in this application in the manner described in prior application Ser. No. 788,876. The waveforms in FIG. 4B show the relative timing operation for the triggers of the clock circuits in FIGS. 9A and 9B. The waveforms in FIG. 4A show the relative timing operations for a similar clock circuit used in generate mode. FIG. 5B shows the sequence of cycles provided by the clock circuits in FIGS. 9A and 9B for a high-level search operation. FIG. 5A shows for the sake of comparison the clock cycles for a low-level operation.

MULTILEVEL SEARCH

A search argument (S.A.) is an uncompressed item found in a search argument list in memory 510 in FIG. 7A. It is to be looked for in the multilevel index represented in FIG. 6, which may be stored on one or more of I/O devices 530C. The search argument may be any alphanumeric item including any special characters; and it may include any uncompressed key (UK) used in generation of the multilevel index, which may be called an original UK. If the item is an original UK, it will be found by a multilevel search. On the other hand if the item is not an original UK, it is not represented in the multilevel index and hence will not be found; but the particular block is found where such item would be placed into the compressed index if the index were later to be updated to include it.

In FIG. 6, a search begins by finding the location of the apex compressed block 4—1 using pointer $R_{4-1}$ stored in the fifth level. This is the pointer stored at the end of generation of the multilevel index in Pat. application Ser. No. 836,930. This pointer therefore locates the place where the search argument must begin searching the multilevel index.

Block 4—1 is then read after accessing it with pointer $R_{4-1}$. As the compressed keys are serially read from block 4—1, they are respectively compared against the search argument using the single block search technique described and claimed in previously cited Pat. application Ser. No. 788,876 or 788,835. As the CK's are respectively compared with the search argument, one of the CK's in the Apex block will compare high with the search argument, and its associated pointer $R_{3-x}$ will be temporarily stored.

The stored pointer $R_{3-x}$ from the apex block is then used to select the correct block at the next lower level (L3). This block is similarly read and its CK's compared with the search argument until the first high CK is found, and its associated pointer $R_{2-x}$ is temporarily stored for retrieving the correct block at the next lower level (L2). Then the block is retrieved with $R_{2-x}$ at the next lower level, and its CK's are read against the search argument until its first high CK is sensed and its associated pointer $R_{1-x}$ is stored. This process of retrieving a block at each lower level continues until the last retrieved pointer selects one of the data level (L0) blocks. Each data block has one or more fields which must define its original UK used in constructing the index. This field is retrieved from the data block and is compared to the search argument to verify whether the retrieved data block is the block required. It is the correct block if its predetermined field compares equal with the search argument. If they do not compare equal, the search argument is not in the compressed index. However the selected multilevel blocks are the only blocks in the index which would need to be updated if it is later required to include this search argument in the index.

The multilevel search described in the immediately proceeding paragraph is obtained by the method shown in FIGS. 14A, B, C, D, E, and F. The accessing of the correct block in the search is done by the method in FIGS. 14D, E and F. The search within any accessed block is performed by the method shown in FIGS. 14A, B and C. FIGS. 14A, B and C are substantially identical to FIGS. 14A, 14B and 14C in prior cited application Ser. No. 788,876; a method of searching within any block is described and claimed therein. Accordingly FIGS. 14A, B and C in this application are not described in detail since the description in application Ser. No. 788,876 is relied on, except for a few changes in its steps. These changes in FIG. 14A are entrances D10 and D12 replacing the start step. In FIG. 14B steps 884, 866 and 867 have been added. In FIG. 14C, the exit label C10 replaces the END step found in this drawing in the prior application.

The hardware shown in FIGS. 3, 9A, 9B, 10, 11, 12 and 13 executes the method in FIGS. 14A, 14B and 14C, in this application in the same manner as in the prior application Ser. No. 788,876, with a single change to FIG. 13 which is the extension of the output from AND-circuit 332 having the designation "current block high on P=0."

Figure 8:
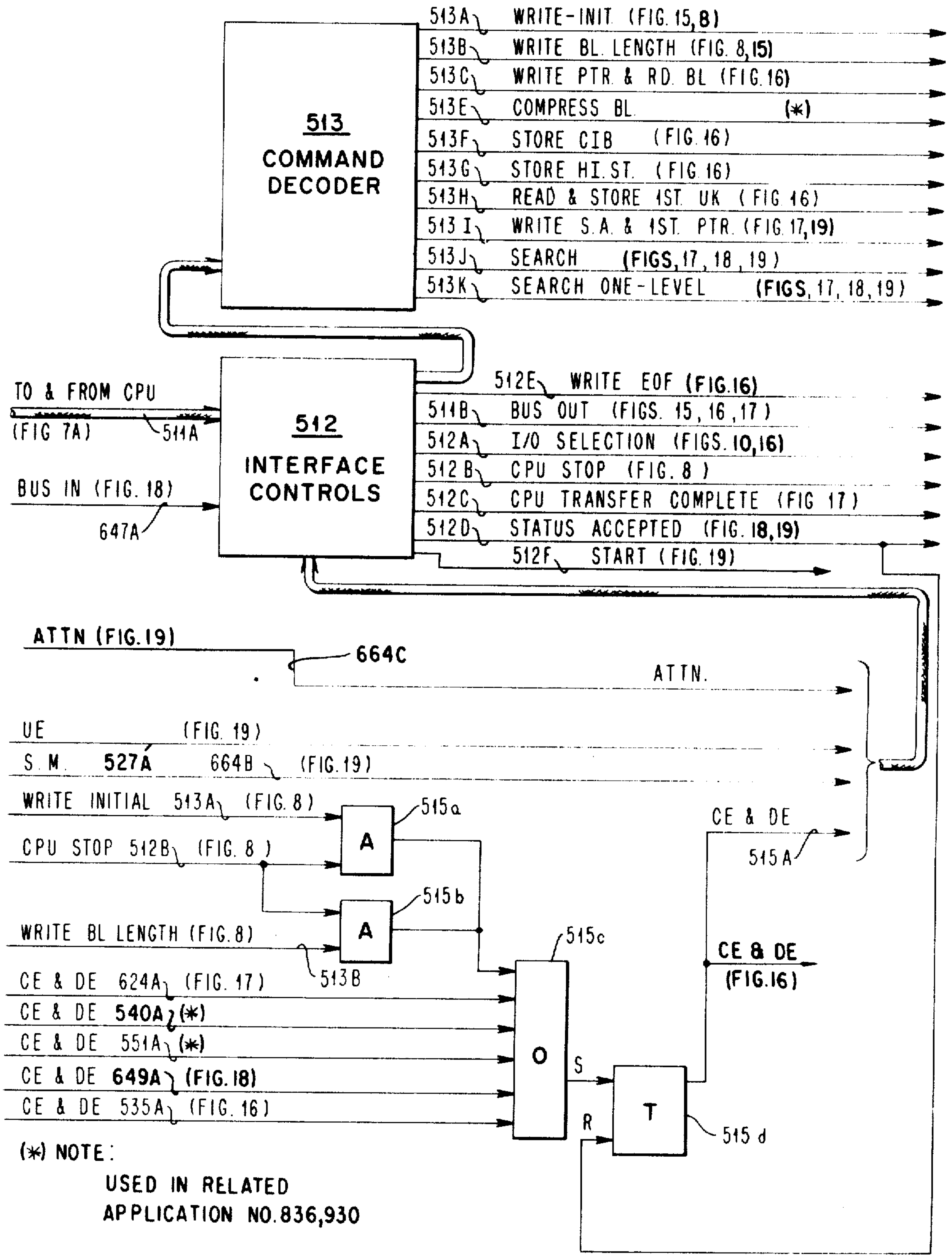
FIG. 8 illustrates the interface controls and command decoder for an embodiment of a multilevel index search control system.
Figure 17:
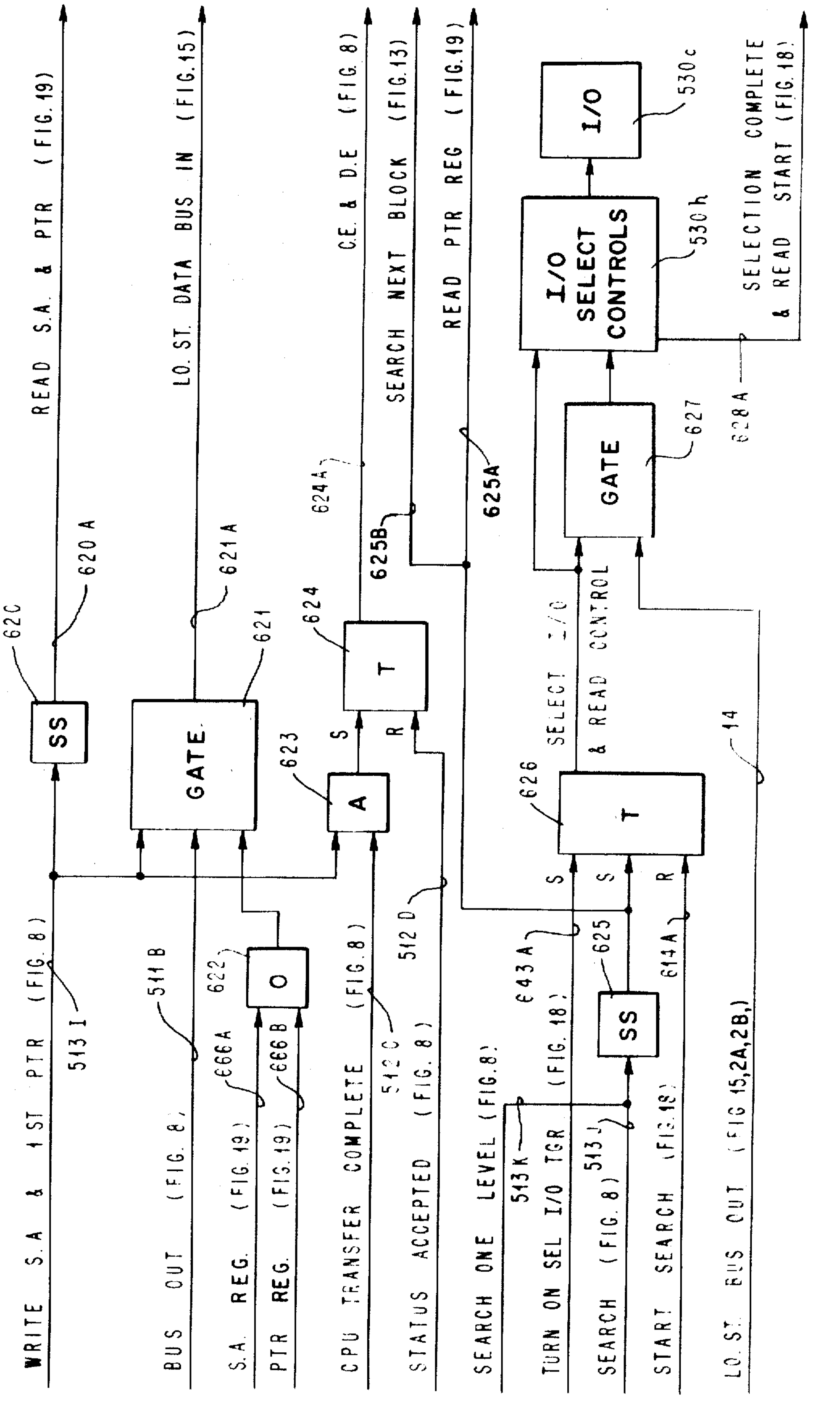
Figure 19:
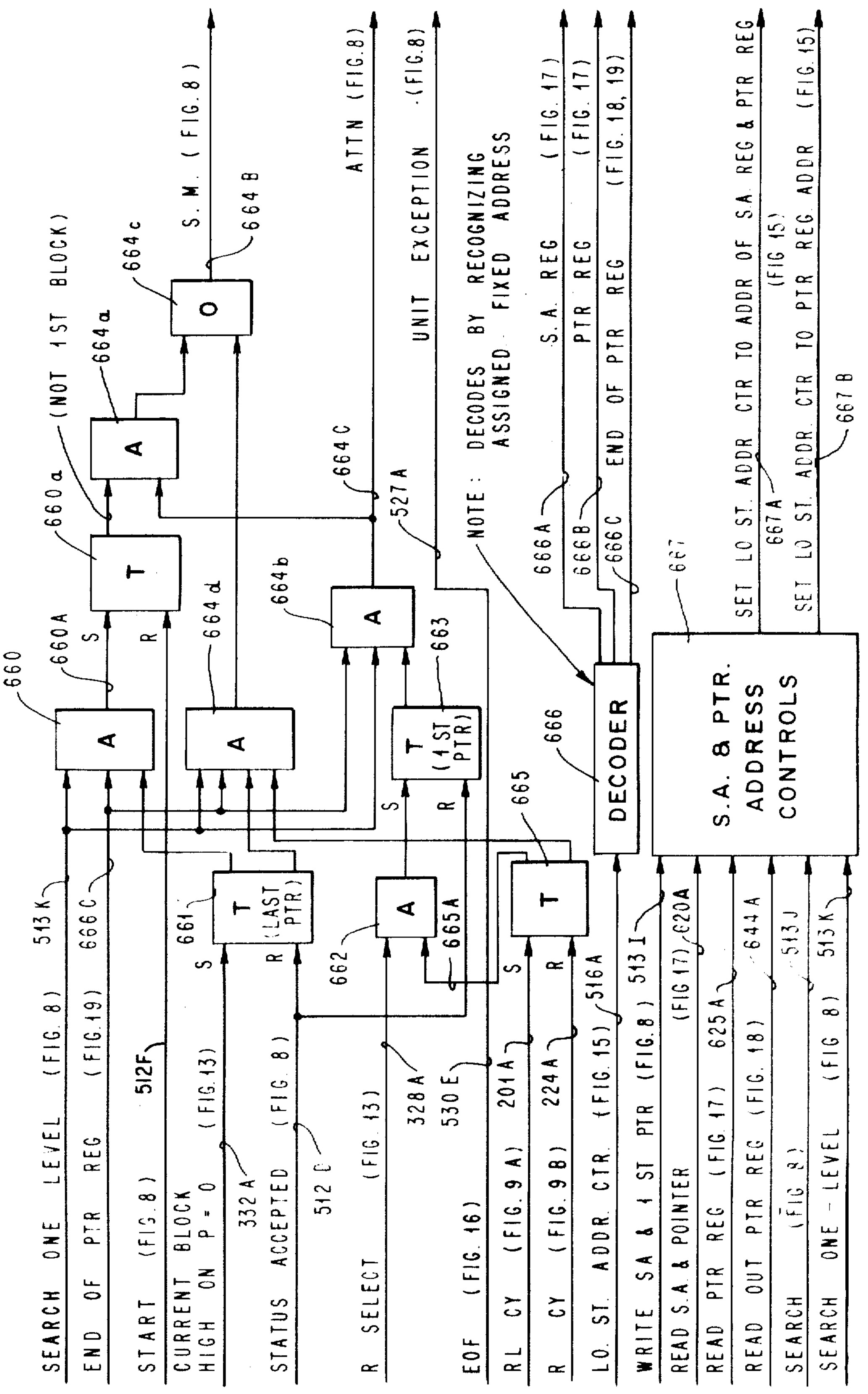

The multilevel search method is entered in FIG. 14D at start step 910, which represents either a manually or automatically induced start operation for accessing the next step 911 which comprises fetching a "write search argument and first pointer" command from the command table in memory 510 in FIG. 7A, and transmitting this command on bus 511A from the CPU to command decoder 513 which decodes the unique bit configuration in its operation code to activate output line 513I in FIG. 8, which is provided to FIGS. 17 and 19. This command is executed at the CPU by its transmission of the search argument and a pointer (initially the pointer to the apex block) to interface controls 512.

Figure 15:
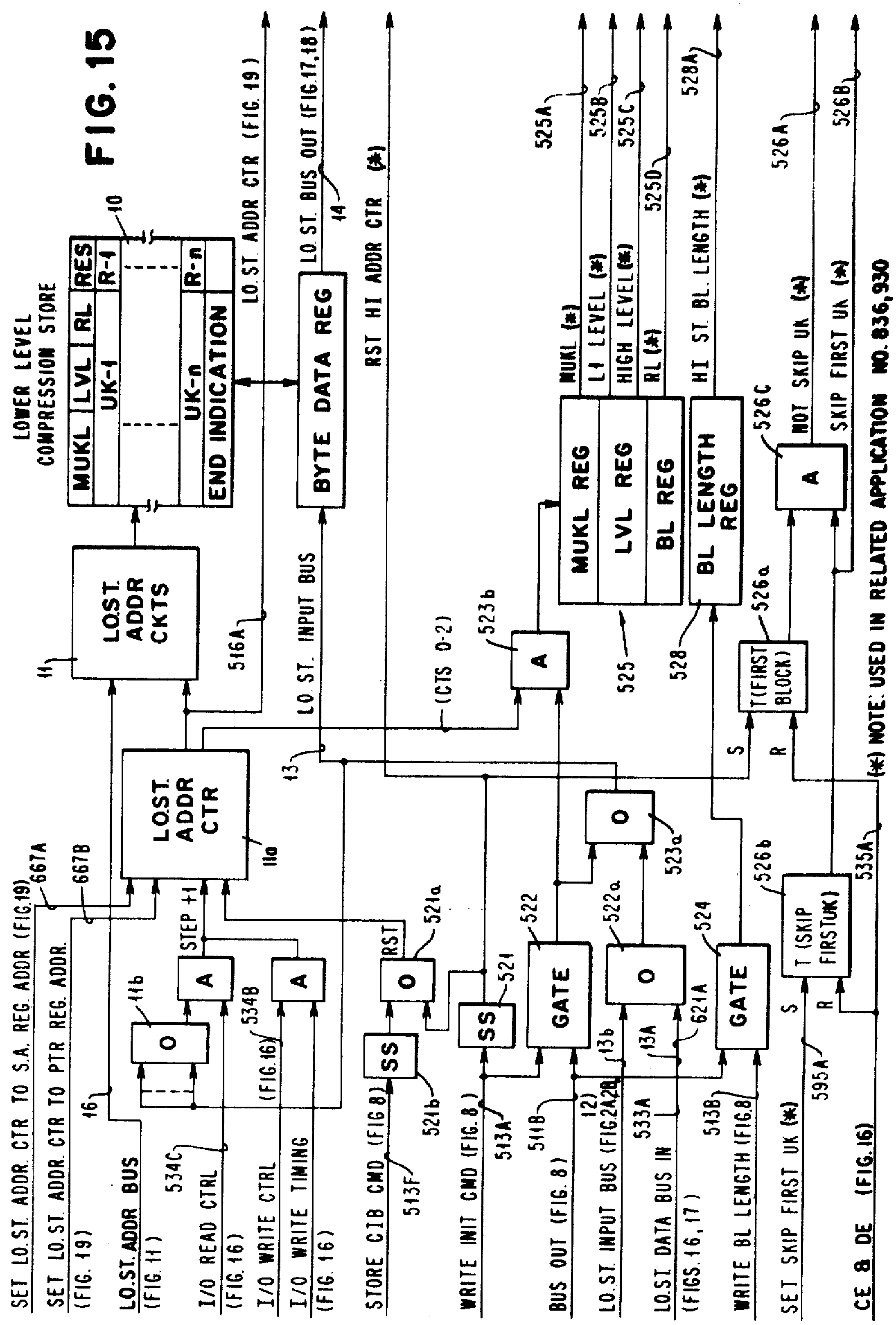

Step 912 is concurrently entered when in FIG. 19, line 513I is activated to S.A. and pointer address controls 667, which then activates its output line 667A to set low store address counter **11*a* in FIG. 15 to the predetermined address of the search argument register in low store 10 shown in FIG. 2B. The pointer register in low store 10** is contiguous with its S.A. register.

Gate 621 in FIG. 17 is activated by the same line 513I so that the search argument bytes received from the CPU on bus out line 511B pass through gate 621 to the low store data bus 621A which is received by OR-circuit **522*a* in FIG. 15 which passes the search argument to the required register in low store 10. During search argument reception, a S.A. field line 666A enables gate 621 via OR 622 in FIG. 17. Line 666A is activated from decoder 666 in FIG. 19 while it receives from counter 11a the byte addresses within the S.A. register field in low store 10. Then line 666C is activated by decoder 666 when the last S.A. byte (padding if necessary) sets the address counter 11*a* to the pointer register location in low store 10, and the pointer byte transfer continues until completed for the pointer locating the apex block of the compressed index in the pointer register in low store 10. Step 912 is completed when the S.A. register and pointer found register are loaded in low store 10**.

Step 913 provides C.E. & D.E. (see summary table on pg, 44) from trigger 624 in FIG. 17 after AND-circuit 623 sets trigger 624 in response to the CPU transfer complete line 512C being activated from the interface controls 512 in FIG. 8. Then the CPU transmits a status acceptance signal on line 512D from interface control 512 which resets trigger 624 to end its C.E. & D.E. signal.

A multilevel search requires that step 920 be actuated in response to step 913 in order for the CPU to fetch a "search" command as its next command from the command table in memory 510. (The alternate step 940 is used for multiblock searching at a single level, and it is described later.)

Figure 18:
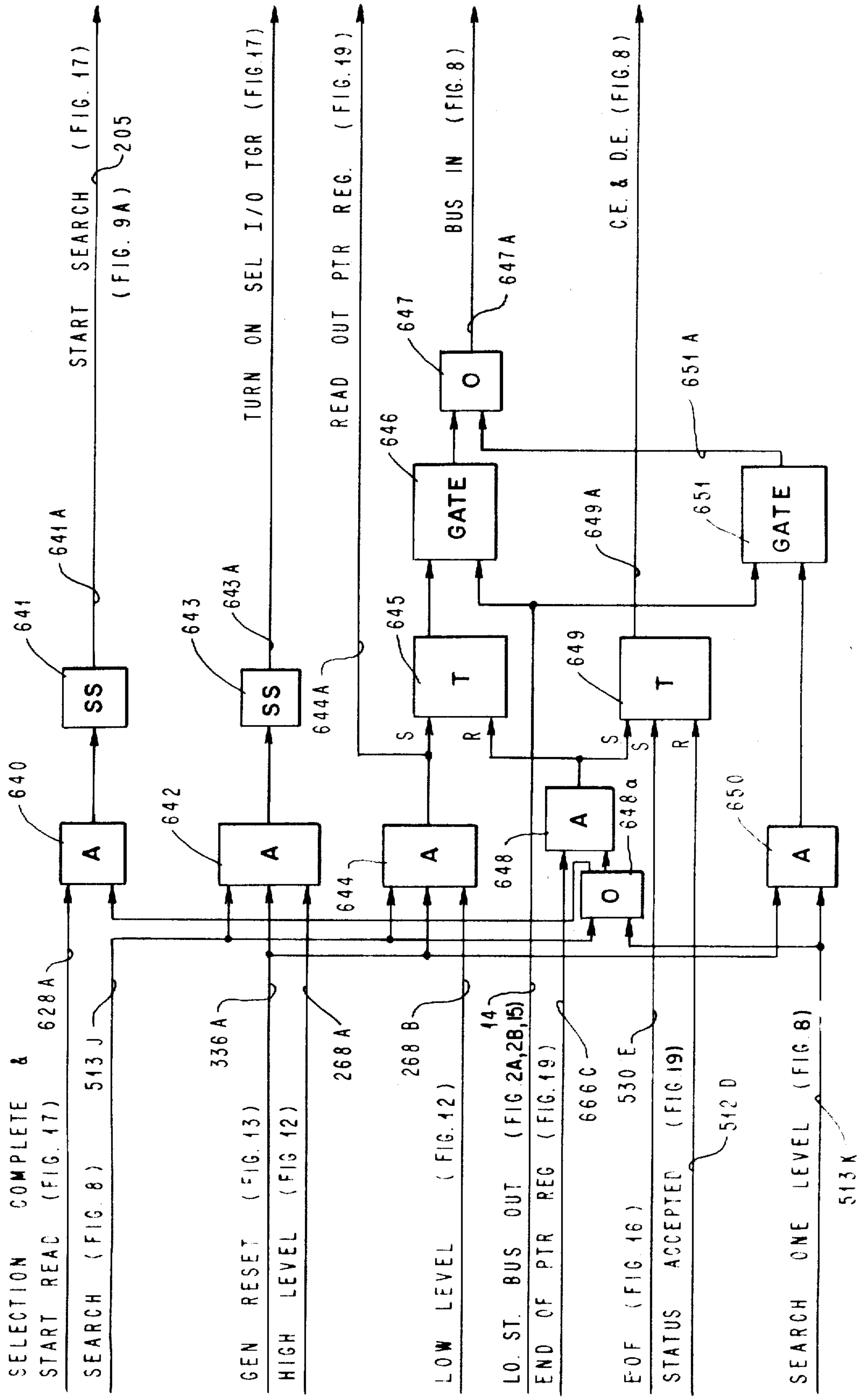

The "search" command is transmitted to command decoder 513 which activates its output line 513J to FIG. 17 and 18. Steps 921 and 922 are concurrently activated.

Figure 16:
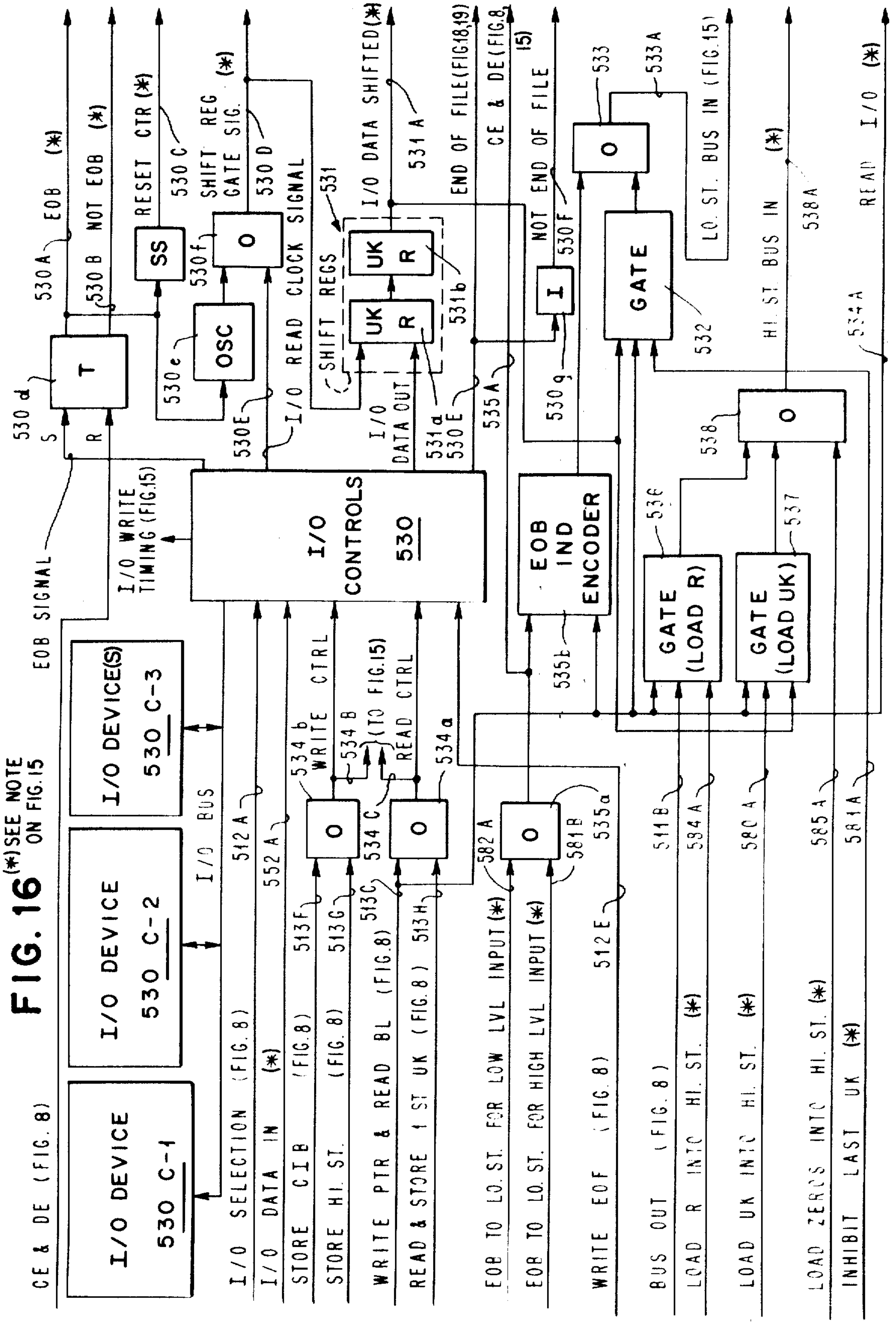

With step 921, the signal on line 513J actuates single shot 625 in FIG. 17 to set trigger 626 which provides a select I/O and read control signal to I/O select controls **530*h* in FIG. 17, which is a component part within the I/O controls 530 in FIG. 16. This conditions gate 627 and controls 530*g***.

The search command line 513J is also provided to controls 667 in FIG. 19 to activate the pointer register address line 667B which causes the low store 10 to read out its pointer register field on low store bus out 14, which is passed by the conditioned gate 627 in FIG. 17 into the conditioned I/O select controls **530*g*. Each I/O device 530*c* is selected with the pointer, which is the same device on which the multilevel index was written by the generation method in previously cited Pat. application Ser. No. 836,930. The apex block is then accessed in I/O 530*c* using this pointer to complete execution of step 921**.

Figure 13:
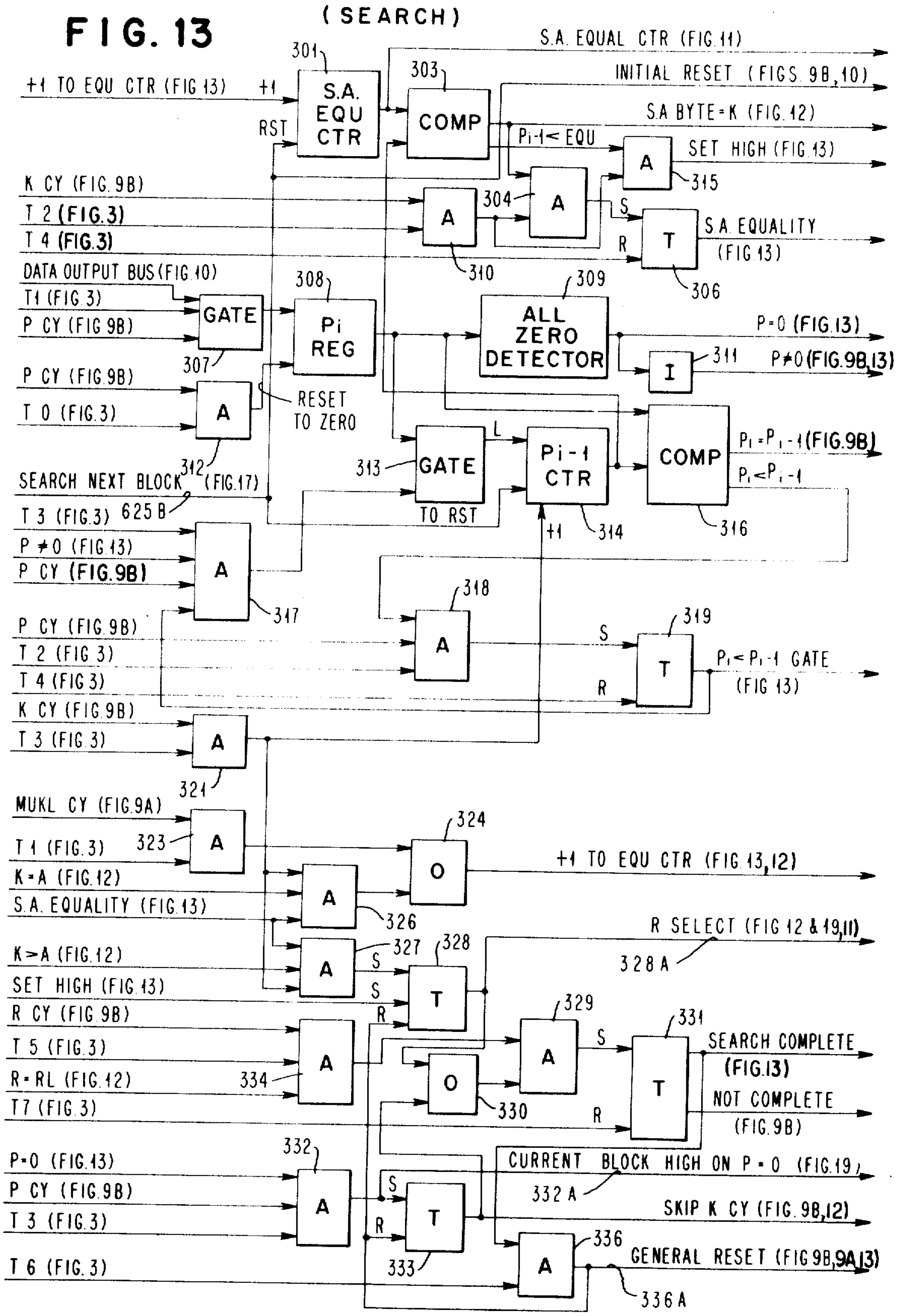

Step 922 is executed when the search command line 513J actuates a single-shot 625 in FIG. 17 which pulses line 625B to FIG. 13, where it resets the search argument equal counter 301. This makes the search of the next block independent of the results of the search of any prior block, except the address of the current block.

Thereon step 923 is entered wherein reading of the accessed block begins, and exit D10 is taken to FIG. 14A for comparing the search argument to the bytes within this block, in the manner described in detail in the prior field application 788,876. When step 844 in FIG. 14A is reached, the byte gated to level register 268 in FIG. 12 activates its high-level output line 268A to FIG. 18.

When the method in FIG. 14B is being executed, step 866 is entered in order to read the high-level block format, in which each pointer has an associated second CK. Step 866 operates with respect to binary trigger 211 in FIG. 9B to indicate that in a high level operation AND-circuit 209 is actuated, and the P-next trigger 213 should be set to execute step 867 in preparation for reading the second CK of the high-level pair. Step 884 follows to control reading of the second CK of a pair.

During the search of the apex block (or any other block) a pointer is found, and it is stored in the pointer register in low store 10 by steps 886–891 in FIG. 14C. This pointer is later used to access the correct block at the next lower level in the multilevel index. Step 892 in FIG. 14C eventually indicates (by trigger 328 being set) that a high key has been found in relation to the search argument, or that (by trigger 333 being set) the last key having P=0 has had its pointer read since no CK in the block compared high with the search argument. Then step 894 indicates that the search complete trigger 331 in FIG. 13 is set, and step 895 is executed by AND-circuit 336 when it provides a general reset output which causes FIG. 14C to exit at C10 to step 930 in FIG. 14D. Step 930 determines if the current command is a "search" or a "search one-level" command, which are the two choices available at this place in the method.

Figure 12:
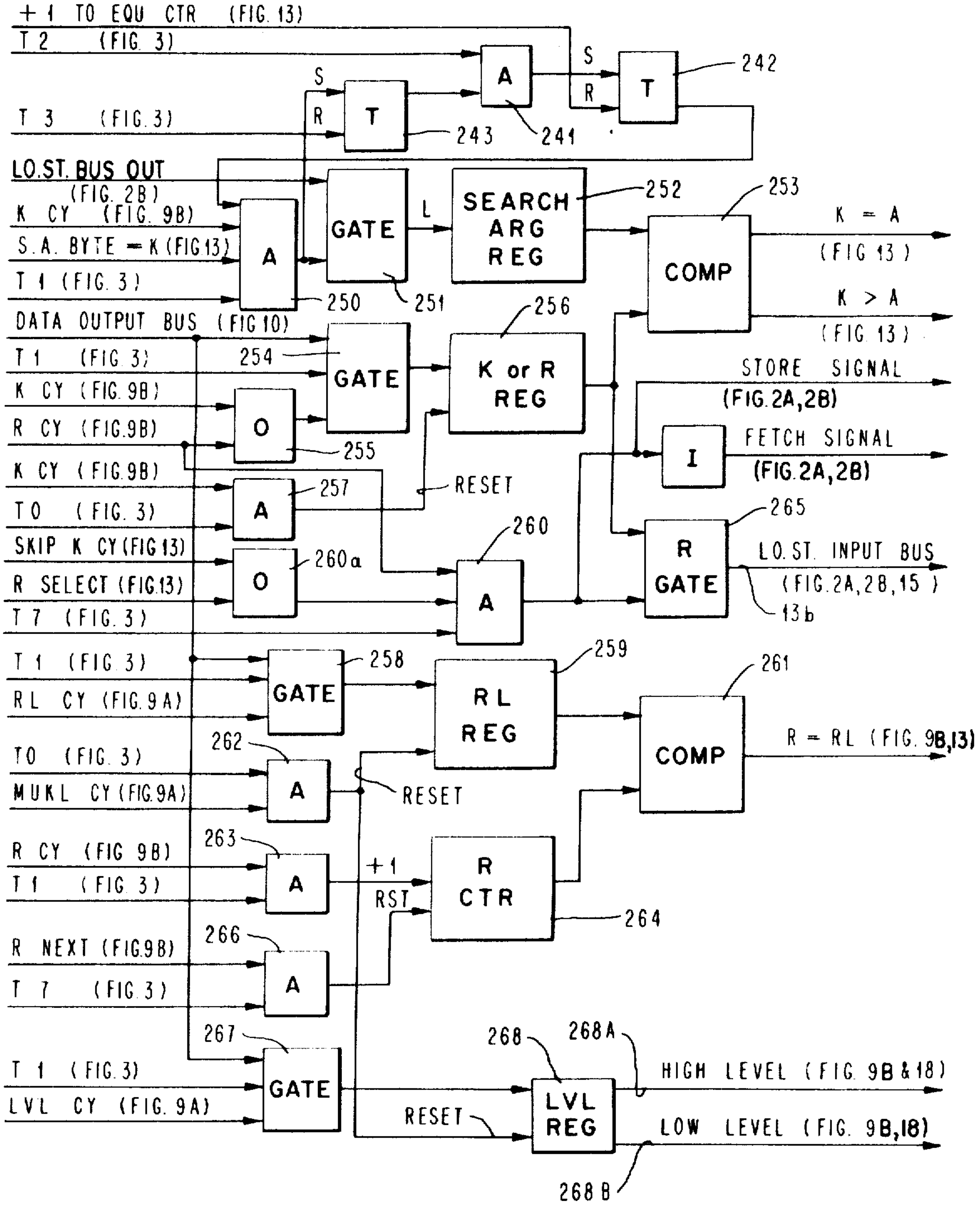
FIGS. 12 and 13 represent circuits used in searching a compressed index.

A "search" command exits step 930 into step 931, which determines the current level according to the signal on high-level line 268A or low-level line 268B from FIG. 12 to AND-circuit 642 or 644 respectively in FIG. 18. Since high level exists initially, line 268A is first activated.

Then step 921 is entered, circuit 642 is activated to fire a single shot 643 which sets trigger 626 in FIG. 17. Step 921 is then executed in the manner previously explained for this step. The output of trigger 626 accesses and reads the block addressed by the current pointer in the pointer register in low store 10 which was placed there by the method components in FIG. 14C.

Then step 922 is executed in the manner previously explained for this step, and exit D10 is taken to FIG. 14A where the steps in FIGS. 14A, 14B and 14C are repeated as previously explained to search the current block for the pointer to the correct block at the next lower level, which pointer is overlayed into the pointer register in store 10 in the manner previously described. Then the exit at C10 in FIG. 14C is taken to FIG. 14D step 930. Since the "search" command is in existence, step 931 is again entered.

The cycling of the method on FIGS. 14D, 14A, 14B and 14C continues with each cycle locating the block at the next lower level in the multilevel index. Step 931 always examines the state of level register 268 in FIG. 12 provided by the level flag byte in the last block read, which does not necessarily represent the level of the block to be addressed by the current pointer in the pointer register of low-level store 10. Thus it is only after a low-level (L1) block has been read that the level register 268 indicates low level for step 931, so that it can signal that the data level L0 block is represented by the current pointer in the pointer register in store 10.

Accordingly the multilevel search method cycles from step 931 to step 921 as long as the multilevel index is being searched. The multilevel search is essentially completed when the L0 pointer has been found and placed in the pointer register in low store 10, which is signalled when step 931 indicates low level. It then exits to step 932, which reads this found pointer from low store 10 to the CPU. Step 932 passes the pointer found for the L0 data block back to the CPU so that the CPU can retrieve the required data block which may be stored on an I/O device not accessible from the I/O controls 530. For example, such a data block might be on another control on the same channel or it might be on another channel available to the same CPU, or it might be available to another CPU with which this CPU can communicate in a multiprocessing system. Step 932 is activated by low-level line 268B activating AND-circuit 644 in FIG. 18 which signals on line 644A to activate controls 667 in FIG. 19 to demark the pointer register address, and set trigger 645 in FIG. 18 to enable gate 646 to pass the found pointer bytes on low store bus out 14 in FIG. 15 through OR 647 in FIG. 18 to bus in 647A and interface controls 512 in FIG. 8, which transmits the pointer to the CPU. Decoder 666 in FIG. 19 indicates, by an output on line 666C, when the transfer has reached the end of the pointer register field. Line 666C then activates AND 648 in FIG. 18 to signal C.E. & D.E. which indicates the end of the search operation.

When step 933 in FIG. 14D provides the C.E. & D.E. signal from line 649A, the CPU signals back on status accepted line 512D via interface controls 512 in FIG. 8. This ends the search operation. It is then up to the CPU to retrieve the data block and verify whether this block is the block with the search argument as its key, or whether the search argument is not in the index.

ONE-LEVEL SEARCHES

A search may be done (1) sequentially of any entire level through the blocks of the single level, or (2) as a binary search of the level, or (3) as a combination of (1) and (2). For any case (1), (2) or (3), a "search one-level" command is used, but different pointers are provided for step 911. For a sequential search the first pointer in step 911 addresses the first block at the beginning of the level to be searched, which can be any level in a multilevel index, such as shown in FIG. 6. The entered level is searched serially from block to block until the correct key is found which is transferred to the CPU 511. It is up to CPU 511 to store this pointer, such as in CPU Reg-1 in memory 510 in FIG. 7A.

In case (2) of the binary search, the pointer for the middle block in the level is first used by step 911. In case (3) of a partial binary search followed by a completing sequential search, the last search block in the binary search can be used to determine the beginning pointer and the number of blocks remaining to be searched in the small section of the one level segregated out by the binary search for the subsequent sequential search.

These three cases of one-level searching by the disclosed hardware require different table-searching programming support by the CPU. Such table-searching programs are fundamentally old and therefore are not discussed in detail herein. In the case of the sequential one-level search, the pointers in the pointer table are sequentially fetched by the table-search program to issue the pointer for the next block at the one level. In the case of the partial binary-search followed by a partial sequential-search of the one level, both table-search programs are invoked with the pointer-location result of the binary search being passed to the beginning of the partial sequential search. The passing of parameters from one program to another is an old technique in the computer arts as of this date.

The initiation of the type of one-level search is done by initiating the required type of table-search program to obtain the correct pointer and call the search hardware control 512, 513, 516 and 530 shown in FIG. 7A, which then does the actual searching of the index on I/O devices 530C.

A one-level search can be made within any level of a multilevel index having plural blocks, whether at or below the apex level. A one-level search is completed by finding the correct pointer within the one level.

Importantly, the one-level search permits searching an apex level that has more than one block. The apex level can then be generated with more than a single block where a fixed number of levels are required in a multilevel index.

The one-level search also increases the reliability of searching by providing a bypass to a failure in any high level. In this case the one-level search can be used to enter the multilevel index at any level below the level which has failed. No index information from higher levels is then required.

Upon the completion of a one-level search at any high level, i.e., above the low level (L1), a multilevel search may be initiated with the pointer found by the one-level search to locate a required data level (L0) block.

In any type of one-level search, sequential or binary, the search is ended whenever a pointer between the first and last pointers in any currently searched block is readout, which happens when a CK in the block between its first CK and last (P=0) CK first compares high with the S.A.

More complexity occurs if the first or last pointer is readout from the currently searched block.

Each block in the index is generated so that its last CK (P=0, no K-bytes, and associated with the last pointer in the block) must compare high with any search argument (S.A.). During any search, the last pointer of a searched block is read out to the pointer register in store 10 if no other pointer was read out from the block.

In, a sequential search, the last pointer readout indicates the search must be continued in the next block to determine: (1) if this last pointer may correctly index the S.A., or (2) if further searching is required to find the correct pointer, it being in a subsequent block at the same level.

In a binary search, the search must be continued if the first or last pointer of a block is readout, until (1) the last binary search level is reached in which situation the last pointer is correct, or (2) two adjacent pointers in different sort-adjacent blocks are read out, in which case the CPU must decide which is correct.

Figure 14E:
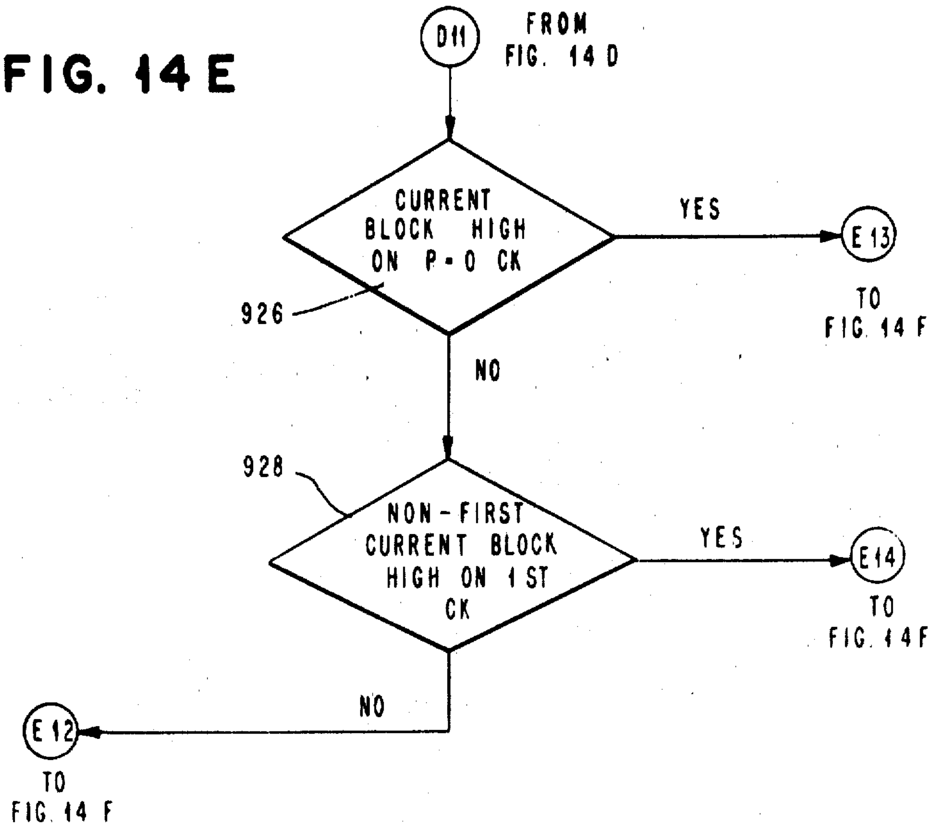
Figure 14G:
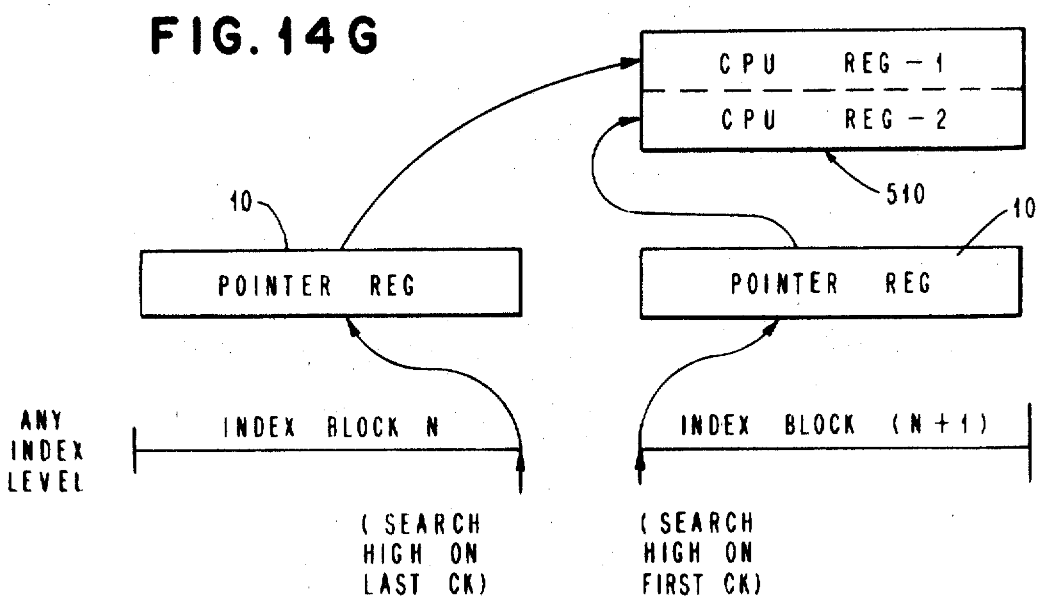

FIG. 14G represents the special case of situation (2) in the last paragraph or situation (1) of the second last paragraph, which can occur in any one-level search. It occurs when the first CK of a next block (N+1) within the one-level compares high with the S.A. In this case the one-level search is ended by the CPU storing two pointers, which are the last pointer of the prior block (N), and the first pointer of the current block (N=1). Then each pointer may be used to initiate a multilevel search of lower levels to retrieve a respective data level (L0) block. A verification comparison of the search argument with the key field in each retrieved L0 block determines which is correct. Of course if the first retrieved L0 block verifies correctly, the multilevel search using the second pointer becomes unnecessary.

A summary table of the signalling conditions at the end of a currently searched block is as follows:

SUMMARY TABLE

| Pointer Readout Condition | Condition-Indicating Signals | Search End Condition |
|---|---|---|
| 1. Last pointer | C.E. & D.E. | Read next block |
| 2. Intermediate pointer | S.M. & C.E. & D.E. | Current pointer correct |
| 3. First pointer | ATTN. & C.E. & D.E. | Current pointer correct |
| 4. Two ambiguous pointers | S.M. & ATTN. & C.E. & D.E. | Current or last pointer correct |
| 5. End of file (No current pointer) | U.E. & C.E. & D.E. | Last pointer correct |

SEQUENTIAL ONE-LEVEL SEARCH

A sequential one-level search is started by step 910 in FIG. 14D, similarly to starting a multilevel search, such as by pushing a start button, or executing a linking instruction. Starting a search selects the control unit and activates line 512F to reset the first block trigger 660a in FIG. 19.

Step 911 follows in the manner previously described, except that the pointer for each iteration by step 911 during a sequential one-level search is obtained from the pointer table in FIG. 7C for the selected one level. The first pointer in the selected pointer table addresses the first block in the level of the index to be searched. The order of the pointers in each pointer table represents the ordered sequence of blocks within the respective level, although the physical locations of these blocks can be anywhere (wherever addressed by the pointers in the table). Therefore step 911 in FIG. 14D responds to step 910 by the CPU fetching and issuing a "write search argument and first pointer" command to fetch the first pointer from the selected pointer table in FIG. 7C.

Step 912 then is executed by the transfer of the search argument and that pointer from the CPU into the S.A. register and pointer register in low store 10.

Step 913 thereupon generates a C.E. & D.E. signal.

Step 940 responds by fetching a "search one-level" command as the next command in the command table in FIG. 7A in a sequence of commands predetermined for a one-level search operation.

Step 941 follows with I/O 530c accessing the block defined by the current contents of the pointer register in low store 10 (in the manner previously described for step 921). Then step 941a resets the equal counter 301 in FIG. 13 in preparation for searching the block; and step 942 is executed in the same manner previously described for step 922 for reading the current block accessed by step 941.

Next, an end of file (EOF) step 943 checks to see if the currently read block has signalled EOF. If not, exit D12 is taken to step 840 in FIG. 14A in order to search the current block being serially read by step 942. But, if EOF exists, U.E. is signalled by step 943a and the one-level search operation is ended. In the latter situation, the correct pointer is the last pointer of the prior block readout to the CPU to obtain condition (5) in the preceding summary table.

At the end of the serial search of any current block (not EOF) by the method in FIGS. 14A, 14B and 14C, exit C10 in FIG. 14C is taken to step 930 in FIG. 14D to check whether the current command is a "search" command or not. If not, it is a "search one-level" command, which is the remaining of the two choices by step 930. For a "search one-level" command, an exit at D11 enters step 926 in FIG. 14E.

The method in FIG. 14E looks for the first and last CK conditions in the currently read block, including the special case previously mentioned in regard to FIG. 14G. Step 926 determines if the last pointer of the current block is readout, and step 928 determines if the first pointer of the current block is read out. It takes two iterations through entry D11 (one for each of two sequential blocks) before it can be determined if both the first CK is high for the current block, and the last CK was high for the prior block.

Figure 14F:
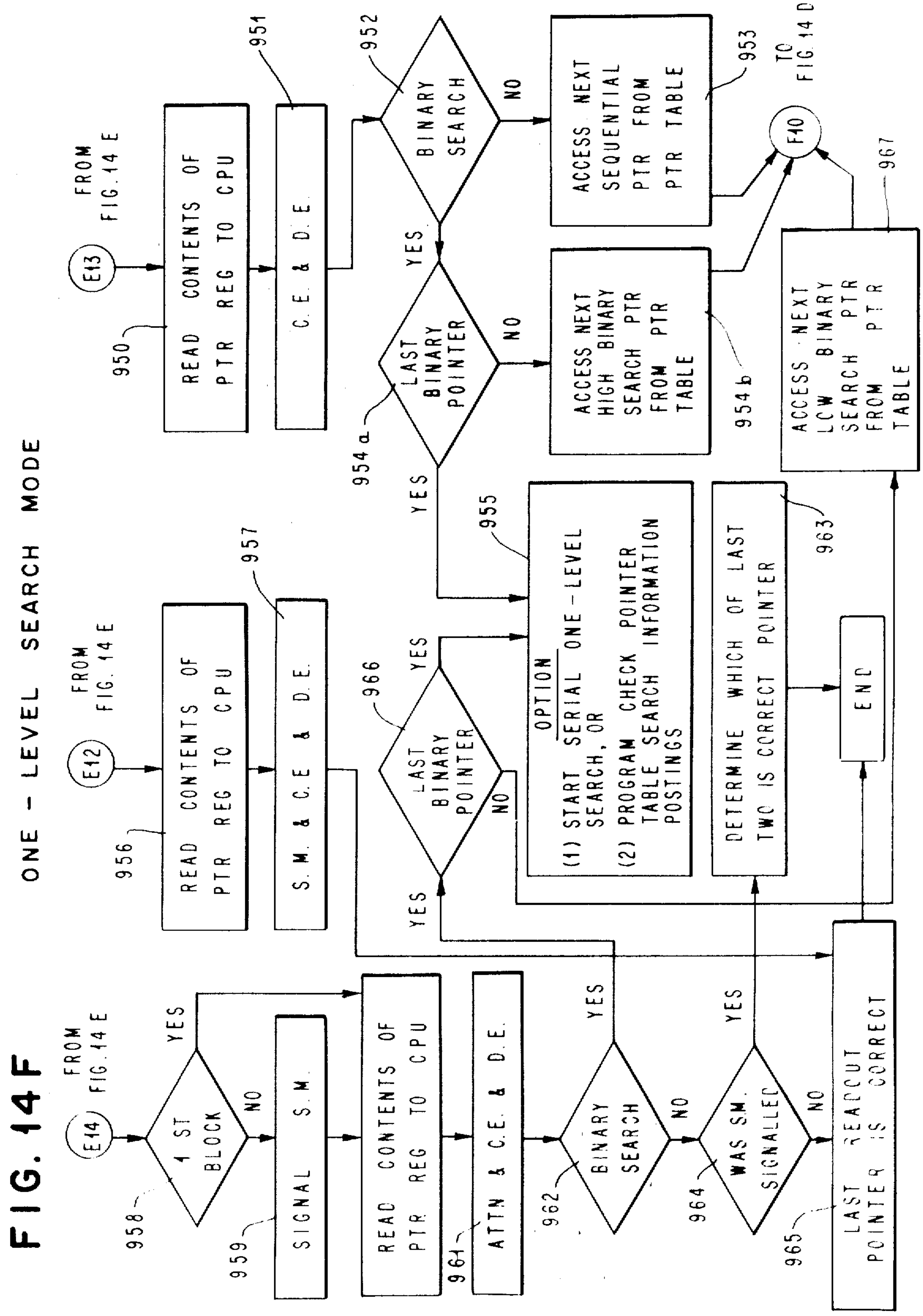

Whenever the readout pointer results from a high CK within the block, i.e., does not result from the first or last CK being high, step 928 enters exit E12 to step 956 in FIG. 14F. Step 956 transfers to CPU 511 the contents of the pointer register in low store 10, and step 957 signals S.M. & C.E. & D.E. to end the one-level search operation represented by condition (2) in the preceding summary table.

If step 926 finds the last pointer of the current block was read out, it exits at E13 to step 950 in FIG. 14F. The Step 950 responds by transferring the last pointer from the pointer register in low store 10 to the CPU, as shown in FIG. 14G. Then C.E. & D.E. step 951 is executed which occurs alone for every block which does not have a CK compare high with the S.A., i.e., the artificial last P=0 CK only compares high. This meets condition (1) in the preceding summary table.

Then step 952 is entered to determine whether the current one-level search is sequential or binary. If sequential, step 953 is entered to access the next pointer in the one-level pointer table to access the next block. Exit F10 results in reiterating steps 911–913 and 940–943 in FIG. 14D with step 911 issuing the "write search argument and first-pointer" command. Step 912 results in transferring the same S.A. (the search is not completed) and the new pointer accessed by step 953. Step 940 reissues the "search one-level" command resulting in the next block being read by step 942 in FIG. 14D. Thereafter if no end of file is reached, the method in FIGS. 14D 14A, 14B and 14C reiterates to exit C10 from FIG. 14C which returns to step 930 in FIG. 14E, and exit D11 is taken to step 926 in FIG. 14E. If the current block readout is its first pointer, then step 926 responds negatively and enters step 928. The prior block reading out its last pointer has no effect on step 926 during the current block.

Thus, step 928 detects if the first pointer is readout from the current block. If yes, exit E14 is taken to step 958 in FIG. 14E to determine if the current block is the first block in the one level index. If yes, the first pointer is the correct pointer, and step 960 is entered to read it from the pointer register in low store 10 to the CPU. Then step 961 signals ATTN. & C.E. &

D.E., and step 962 negatively indicates the existence of a sequential search. Step 964 follows to indicate that S.M. was not signalled so that the CPU knows condition (3) in the preceding summary table exists. Then the one-level search is ended.

However, if step 958 exits negatively, step 959 signals S.M. to indicate that the current block is not the first block of the index. Then the correct pointer is either the currently readout first pointer, or the last pointer of the prior block. Then step 960 reads the first pointer from low store 10 to the CPU. The S.M. signal causes the CPU to store the new pointer in memory 510, such as in CPU Reg–2. Step 961 then signals ATTN. & C.E. & D.E.. The CPU then has sufficient information via steps 962 and 964 to execute step 963 and end the operation condition (4) in the summary table is than met. The one-level operation is ended at step 964, and the CPU can execute step 963 by initiating a multilevel search as previously described for each of the two pointers to determine which is the correct one.

A particular set of circuits for obtaining the sequential method in FIGS. 14D, E and F is included in FIGS. 17, 18 and 19. The circuits for steps 910–913 have previously been described in connection with the multilevel search operations. The circuits for steps 940–943 are the same as the circuits for steps 920–923, except that decoder line 513K is activated instead of line 513J. The EOF line 530E is reserved in FIG. 19 to signal U.E. (in step **943*a* in FIG. 14D**) which results in an end of a sequential one-level search, and provides conditions (5) in the preceding summary table.

In FIG. 18, a C.E. & D.E. signal is provided from trigger 649 when it is set by either (1) the EOF line 530E, or (2) at the end of a pointer transfer into low store 10. This C.E. & D.E. signal indicates to the CPU that it should select the next command in the Command Table in FIG. 7A, as a function of existing conditions.

Trigger 649 is set at the end of a pointer transfer by activation of an AND-circuit 648 when line 666C is activated by decoder 666 in FIG. 19 when the last byte is addressed in the pointer register in low store 10 during the current "search one-level" command signal on line 513K to OR-circuit **648*a*. After the CPU has accepted the transferred pointer, and the status signals, it signals back via the interface on the status accepted line 513D, which resets trigger 649**.

The C.E. & D.E. signal may occur alone or in combination with ATTN., and/or S.M. signal(s) upon transferring a pointer to the CPU for completing the execution of a search one-level command. The particular combination of these signals indicates to the CPU how it should handle the received pointer. The preceding summary table states the meaning of each of these signals to the CPU. Then normal programming (not described herein) can be provided at the CPU to handle the storing and accessing of the pointer or pointers in Memory 510.

Thus a C.E. & D.E. signal is provided after every pointer transfer to the CPU. If no ATTN., S.M. or U.E. signal is provided at the end of this one-level command, then the C.E. & D.E. signal occurs alone, which signifies to the CPU that the correct pointer has not been recognized and the sequential search should continue by reading the next sequential block.

However if the ATTN., S.M., or U.E. signal is also provided by step 961, 959 or **943*a*, this signal (rather than the concurrent C.E. & D.E.) controls the CPU in regard to the transferred pointer. The C.E. & D.E. signal indicates to the CPU that the transferred pointer was the last pointer in the current block, and that the next block should be read. The U.E. signal indicates end of file to the CPU and that the last transferred pointer is the last pointer in the one-level index, and that it therefore is the correct pointer. The S.M. & C.E. & D.E. signal indicate the readout pointer is a correct intermediate pointer. When both S.M. and ATTN. signals are transmitted, they indicate to the CPU the special case shown in FIG. 14G**, wherein the transferred pointer is the first pointer of the block, and that either it or the last pointer of the prior adjacent block is the correct pointer. The CPU must then initiate the determination.

FIG. 19 shows the circuits for generating the ATTN., S.M. and U.E. signals. They are respectively generated by AND-circuit **664*b*, OR-circuit 664*c*, and line 530K. The ATTN. and S.M. signals are controlled by AND-circuits 660, 664*d*, and 664*b*, each being conditioned by activation of the line 513K and the end of pointer register line 666C**.

AND **664*d* generates the S.M. signal for step 957; AND 664*a* generates the S.M. signal for step 959; AND 664*b* generates the ATTN. signal for step 961; and line 530K generates the U.E. signal for step 943*a*** from the EOF signal.

AND-circuit 660 is enabled by the setting of the last pointer trigger 661 by line 332A, which is activated from FIG. 13 when the current block reads out its last pointer, i.e., high on P=0. Trigger 661 is reset by CPU activation of the status accepted line 512D. When AND 660 is enabled, it sets a not first block trigger **660*a*. Trigger 660*a* is initially reset by activation of the start line at the beginning of a search through the one-level. Trigger 661 is set by the P=0 CK with the last pointer of the first block, if no prior CK compared high with the S.A. This setting of trigger 660*a*** indicates that thereafter each block in the one-level is not the first block.

An AND **664*a* generates an S.M. signal by concurrent activation of not first block trigger 660*a*, and a first pointer AND-circuit 664*b*. AND-circuit 664*b* is conditioned by the setting of a first pointer select trigger 663, which is set by activation of an AND-circuit 662. A first pointer trigger 665 controls activation of AND-circuit 662. Trigger 665 is set at the beginning of the currently read block by its pointer-length flag-byte clock signal, RL CY; and it is reset by the first pointer reading clock signal, R CY. Accordingly, trigger 665 is set during the time that the first CK of the block is being compared to the S.A. If the first CK compares high, a pointer select trigger 328 in FIG. 13 is set to activate R select line 328A to AND-circuit 662 in FIG. 19. Hence activation of AND-circuit 662 indicates that the first pointer (which is about to be read) is to be selected; and it sets first pointer select trigger 663. Then AND-circuit 664*b* is activated at the end of the transfer of the pointer into the pointer register in low store 10 by activation of line 666C**.

AND-circuit **664*a* is therefore enabled by the activation of AND-circuit 664*b* when the current block is not the first block of the one-level. The current block not being the first block is indicated by readout of the last pointer of the prior block, which set not first block trigger 660*a***.

Accordingly AND-circuit **664*a* signals S.M. via OR 664*c* on line 664B when it is activated under these conditions to signal step 959**, so that CPU has the information that it should examine the two pointers last transferred to it.

A signal on line 530E from I/O control 530 in FIG. 16 indicates the current block represents end of file (EOF). This signal is provided on line 530K to interface controls 512 in FIG. 8 to signal the CPU that the last pointer of the prior block was the last pointer of the one-level index, and it hence is the correct pointer.

BINARY ONE-LEVEL SEARCH

Another alternate search through the blocks of a single level may be done by using the "binary search." It also uses the pointer table in FIG. 7C for the particular level being searched. As previously stated, each pointer table has its pointers arranged in the sorted sequence of the blocks represented by the pointer. Programs for the binary searching of tables are well known in the computer arts; hence the binary search is only a well known component used by this invention. Thus binary searching is not discussed in depth herein.

The binary search also begins with start step 910 in FIG. 14D. Step 911 is executed by the "write search argument and first-pointer" command selecting the middle pointer from the table (or next to the middle if the table has an even number of pointers). Step 912 loads the pointer register and search argument register in low store 10 with that pointer and the required search argument, respectively.

Step 940 then issues a "search one-level" command; and step 941 accesses that block. Step **941*a* resets the search-argument equal counter, and step 942 reads the block for searching as exit D12 is taken to FIG. 14A. Step 943** is skipped in a binary search because none of the selected pointers represents the end of file block.

After the block is searched by FIGS. 14A, 14B and 14C, step 930 in FIG. 14D is entered at C10 and exited at D11, since the "search" command is not being used. Step 926 in FIG. 14E is entered.

FIG. 14E operates for the binary search in the same way it operated for the sequential search.

Whenever the current readout pointer is an intermediate pointer (neither the last or first pointer in the current block), the readout pointer is correct, and the search is ended by entering E12 in FIG. 14F which operates as previously explained for the sequential search. This meets condition (2) in the previous summary table.

However if either the first or last pointer is readout by the current block (summary table condition (1), (3), or (4), entrance E14 or E13, respectively, is taken to FIG. 14F to continue the binary search. A first-pointer readout results in signalling ATTN. & C.E. & D.E.. A last-pointer readout results in signalling C.E. & D.E. alone.

The current readout of the first or last pointer choses between the two pointers available in the next level of the binary search. The well-known binary-search algorithm choses the next-available pair of pointers. A first-pointer readout choses the next-available pointer, in the upper part of the table for selecting a block lower in the index; a last-pointer readout choses the next-available pointer in the lower part of the table for selecting a block higher in the index.

The process repeats with respect to the next selected block, which then becomes the current block. Each next level of the binary search narrows the maximum number of blocks which may yet need to be searched. This maximum number is $½^M$ of the total number of blocks in the one-level being binary searched, where M is the current binary level of the search. Thus M is one at the beginning of the binary search and increases by one each time a new pointer is accessed for the binary search. Thus the maximum number of blocks in the one-level requiring further searching decreases exponentially as the binary level, M, increases.

If step 926 finds the last pointer of the current block was read out, it exits at E13 to step 950 in FIG. 14F. The step 950 responds by transferring the last pointer from the pointer register in low store 10 to the CPU, as shown in FIG. 14G. Then C.E. & D.E. step 951 is executed which occurs alone for every block which does not have a CK compare high with the S.A., i.e., the artificial last P=0 CK only compares high. This meets condition (1) in the preceding summary table.

Then step 952 is entered to determine whether the current one-level search is sequential or binary. If binary, step **954*a* is entered for the CPU to determine if the current block (represented by the current binary pointer) is the last block in the current binary-search tree. In general, there are a fixed number $M_t$ of binary levels in any search tree applied to a particular size table in FIG. 7C. Well-known techniques exist for ending a binary search. For example, if the current pointer is the last of a total of $M_t$ number of pointers used to search for the current search argument, step 954*a* exits to step 955 to determine any dual-ambiguity special condition shown in FIG. 14G**.

If step **954*a* finds less than $M_t$ blocks have been read in the current binary tree, step 954*b* is entered for accessing the next higher pointer (made available by the binary table search program) which is higher than the current pointer in the pointer table. Exit F10 is taken from step 954*b***.

Hence a binary search of any level in the multilevel index requires between one and $M_t$ (inclusive) number of block searches to find a correct pointer. And $M_t$ is equal to the logarithm to the base two of the total number of blocks at that level, i.e., $LOG_2$ T. For comparison, the maximum number of block searches needed by a sequential search of one-level is between one and the total number of blocks, T, at the one level. Hence the binary search, on the average, is $T/M_t$ times faster than the sequential search for a complete one-level search.

Exit F10 results in reiterating steps 911–913 and 940–943 in FIG. 14D with step 911 issuing the "write search argument and first-pointer" command. Step 912 results in transferring the same S.A. (the search is not completed) and the new pointer accessed by step 953. Step 940 reissues the "search one-level" command resulting in the next block being read by step 942 in FIG. 14D. Thereafter if no end of file is reached, the method in FIGS. 14D, 14A, 14B and 14C reiterates to exit C10 from FIG. 14C which returns to step 930 in FIG. 14E, and exit D11 is taken to step 926 in FIG. 14E. If the current block readout is its first pointer, then step 926 responds negatively and enters step 928. The prior block reading out its last pointer has no effect on step 926 during the current block.

Thus, step 928 detects if the first pointer is readout from the current block. If yes, exit E14 is taken to step 958 in FIG. 14E. The determination by step 958 of whether the current block is the first block in the one-level index is ignored in this binary search, i.e., whether an S.M. signal is generated by step 959 is ignored, since it makes no difference to the binary search which exit from step 958 is taken to reach step 960 which reads the pointer from the pointer register in low store 10 to the CPU.

Then step 961 signals ATTN. & C.E. & D.E., and step 962 must positively indicate the existence of a binary search. Step 966 follows and is executed identically to step **954*a* to determine if the current block is the last in the current binary search tree. If not, step 967 is entered to access the next lower pointer (made available by the binary table search program) that is lower than the current pointer in the pointer table. Then exit F10** is taken for searching the next one-level block.

If step 966 exits to step 955, the operation previously described for the yes exit from step **954*a*** results.

A particular set of circuits for obtaining the binary search method in FIGS. 14D, 14E and 14F is included in FIGS. 17–19. The circuits for steps 910–913 have previously been described in connection with the multilevel search operations. The circuits for steps 940–943 are the same as the circuits for steps 920–923, except that decoder line 513K is activated instead of line 513J.

In FIG. 18, a C.E. & D.E. signal is provided from trigger 649 when it is set by at the end of a pointer transfer into low store 10. (The end of file condition is not used during a binary search).

The C.E. & D.E. signal indicates to the CPU that it should select the next command in the command table in FIG. 7A, as a function of existing conditions.

Trigger 649 is set at the end of a pointer transfer by activation of an AND-circuit 648 when line 666C is activated by decoder 666 in FIG. 19 when the last byte is addressed in the pointer register in low store 10 during the current "search one-level" command signal on line 513K to OR-circuit **648*a*. After the CPU has accepted the transferred pointer and status signals, it signals back via the interface on the status accepted line 513D, which resets trigger 649**.

The C.E. & D.E. signal may occur alone or in combination with ATTN., and/or S.M. signal(s) upon transferring a pointer to the CPU for completing the execution of a search one-level command. The particular combination of these signals indicates to the CPU how it should handle the received pointer. The preceding summary table states the meaning of each of these signals to the CPU. The normal programming (not described herein) can be provided at the CPU to handle the storing and accessing of the pointer or pointers in memory 510.

Thus a C.E. & D.E. signal is provided after every pointer transfer to the CPU. If no ATTN. or S.M. signal is provided at the end of this one-level command, then the C.E. & D.E. signal occurs alone, which signifies to the CPU that the correct pointer has not been recognized and the binary search should continue by reading the next chosen block.

The ATTN. & C.E. & D.E., or the C.E. & D.E. alone provided by step 961 or 951, respectively, control the CPU in regard to the transferred pointer. The C.E. & D.E. signal alone indicates to the CPU that the transferred pointer was the last pointer in the current block; and that a higher block in the index should be read, since the last pointer is not necessarily the correct pointer. The ATTN. signal indicates the first pointer was readout in the current block; and that a lower block in the index should be read since the first pointer is not necessarily correct in a binary search. This next block is chosen from the two blocks (one higher and one lower than the current block) made available by the binary table-search program, previously discussed.

FIG. 19 shows the circuits for generating the ATTN. signal. It is generated by AND-circuit **664*b*** as described herein in the section titled "Sequential One-level Search."

COMBINED BINARY AND SEQUENTIAL SEARCH

A one-level search can sometimes be more efficiently done by combining the binary and sequential search techniques. Because of the exponential nature of the binary search it is particularly effective during its initial levels in narrowing down the maximum remaining number of blocks in the one-level which may need searching. Toward the end of the binary search, it may not be more efficient than the sequential search. In such case the binary search can be ended at a binary-level B, which has a value less than the maximum number M of binary levels in a search tree. The value M depends on the particular number of pointers in the current pointer table. The shift from the binary search over to the sequential search can be controlled by the CPU when it senses that B levels of binary searching have been completed. Then the remaining fraction of the index which need searching is determined by the pointer selected by step **954*b* or 967** during the search of the last binary level B. This pointer locates the middle of the remaining fraction of the index, which will be sequentially searched. The remaining fraction is $1/2^B$ of the number of blocks in the index level, which is the same as $1/2^B$ of the total number T of pointers in the current pointer table; i.e., $T/2^B$.

Therefore the sequential search will begin with a pointer which is one-half $T/2^B$ number of pointers above the pointer last defined by step **954*b* or 967, i.e., $T/2^{B+1}$ number of pointers above the binary-search pointer selected by step 954*b* or 967** during the search of the last binary level B.

Another use for the combined search is found in option (1) of step 955 in FIG. 14F. Here the binary search has completed its last binary level M at the end of its search tree, as is indicated by the yes exit from step **954*a* or 966. Step 955 is only needed in the special case where the last binary-searched block has readout its first or last pointer. Option (1) then initiates a sequential search to obtain both pointers for the situation illustrated in FIG. 14G**. If the last readout pointer was the first pointer in the last binary-searched block, a two-block sequential search is initiated with the adjacent prior pointer in the pointer table (relative to the table pointer for the last binary searched block).

If the last readout pointer was the last pointer in the last binary searched block, a one-block sequential search is initiated with the next adjacent pointer in the pointer table (also relative to the table pointer for the last binary-searched block).

Option (2) for step 955 accomplishes the same function by posting search information with each pointer in the pointer table representing a block searched for the same search argument. At least three posting bits are provided with each pointer, such as a search-made bit, a first or last pointer bit, and a search-completion bit. The dual-pointer condition in FIG. 14G can then be detected by examining the posted bits to determine whenever two adjacent pointers with their search-made bits set also have their first or last bits set to indicate last for one pointer and first for the next lower pointer in the table. Any further searching is then ended.

What is claimed is:

1. A method of searching for a search argument in a multilevel index having a high-level format in which each index entry includes a pair of compressed keys associated with a respective pointer, and a low-level format in which each entry includes a single compressed key associated with a respective pointer, comprising
   - machine selecting an initial high-level block in said index as the first compressed block in the search,
   - machine resetting a search-argument equal counter to an initial state prior to searching any block in said index,
   - machine reading said high-level block,
   - machine comparing the search argument with the respective pairs of compressed keys in said initial block in their ordered sequence,
   - machine incrementing said equal counter to indicate a current searched-for byte position of said search argument upon each key byte comparing equal with a current searched-for byte of said search argument,
   - machine indicating the next lower ordered byte position of said search argument as its current searched-for byte position in response to said machine-incrementing step, and
   - machine retrieving a pointer associated with a pair of compressed keys in which either compressed key of the pair compared high with the current search-argument byte,
   - whereby said pointer addresses a block in a next lower level of said index.

2. A method of searching as defined in claim 1 in which
   - said machine-selecting step selects a highest level block of the multilevel index as said initial high-level block, whereby said highest level block is an apex block of said index.

3. A method of searching as defined in claim 1 in which
   - said machine-selecting step selects any block of the multilevel index as said initial high-level block,
   - where a search begins with a high-level block other than an apex block.

4. A method as defined in claim 1 in which a pointer obtained by said machine-retrieving step addresses a high-level block in the next lower level, the method including the following steps of
   - next machine selecting the block addressed by said pointer, and
   - machine applying said machine-resetting, machine-reading, machine-comparing, machine-incrementing, machine-indicating, and machine-retrieving steps to the block obtained by said next machine-selecting step,
   - whereby a last-retrieved pointer addresses a next lower level of said index.

5. A method as defined in claim 1, in which a pointer obtained by said machine-retrieving step addresses a low-level block, the method including the following steps of
   - further machine selecting a low-level block addressed by said pointer,
   - machine resetting said search argument equal counter to an initial state prior to searching said low-level block,
   - machine reading said low-level block,
   - machine comparing the search argument with the respective compressed keys in said low-level block in their ordered sequence,
   - machine incrementing said equal counter to indicate the current search-argument byte position upon any key byte comparing equal with a current byte of said search argument,
   - machine-indicating the next lower-ordered byte position of said search argument as its current byte position in response to said last-mentioned machine-incrementing step, and machine retrieving a data pointer associated with a compressed key which first compares high in said low-level block with the current byte of the search argument, whereby the last-retrieved pointer may address the data block being searched-for by said search argument.

6. A method of searching for a search argument in one level of a compressed index using a pointer table with the addresses of blocks in said one level sequenced in the sorted order of said blocks, comprising machine ordering the selection of pointers in said table, each next selection of a pointer being in response to a predetermined type of pointer-position signal, machine selecting a block addressed by a first pointer selected from said pointer table, machine resetting a search-argument equal counter to an initial state prior to searching said block, machine reading said block obtained by said machine-selecting step, machine comparing the search argument with the respective compressed keys in said block in their ordered sequence, machine incrementing said equal counter to indicate the current search-argument byte position upon each key byte comparing equal with a current byte of said search argument, machine indicating the next lower-ordered byte of said search argument as its current byte in response to said machine-incrementing step, machine retrieving the pointer associated with any compressed key in said block which first compares high with the current search argument byte, and machine-signalling pointer-position signals for relating the pointer obtained by said machine-retrieving step to the location of the pointer in its block.

7. A method as defined in claim 6 in which said machine-signalling step includes machine generating a last-position signal to indicate when the pointer obtained by said machine-retrieving step is the last pointer in its block.

8. A method as defined in claim 6 in which said machine-signalling step includes machine-generating an intermediate-position signal to indicate the pointer obtained by said pointer-retrieving step is between the first and last pointers in said block.

9. A method as defined in claim 6 in which said machine-signalling step includes machine generating a first-position signal to indicate the pointer obtained by said pointer retrieving step is the first pointer of a block in said index.

10. A method of searching as defined in claim 6, in which said machine-signalling step includes machine generating a first-position signal to indicate when the pointer obtained by the machine-retrieving step is the first pointer in its block and its block is not the first block of its level.

11. A method of searching as defined in claim 6, including the following steps of next machine selecting the next block addressed by a next pointer selected from the pointer table in response to said machine-ordering step responding to the pointer-position signal from said machine-signalling step, and machine repeating said machine-resetting step, machine-reading step, machine-comparing step, machine-incrementing step, machine-indicating step, machine-retrieving step, and machine-signalling step for said block last accessed by said next machine-selecting step.

12. A method of searching as defined in claim 11 including the following steps of machine sensing for a predetermined form or sequence of said pointer-position signals upon the occurrence of each pointer-position signal, a search-completion signal being generated upon said machine-sensing step detecting said predetermined form or sequence, and machine reiterating said machine-repeating step until said search completion signal is generated.

13. A method of searching as defined in claim 11, within which said machine-ordering step selects pointers from said pointer table in the sorted sequence of the blocks in said one level, whereby a sequential one level search is obtained.

14. A method of searching as defined in claim 11, within which said machine-ordering step selects pointers from said pointer table in a binary-search sequence which is responsive to said machine-signalling step.

15. A method as defined in claim 8 further comprising machine ending said search at said one level in response to said intermediate-position signal being provided by said machine-generating step, whereby a last-retrieved pointer addresses a next-required block in a next lower level.

16. A method of searching as defined in claim 13 including the following steps machine sensing an end of index upon said machine-ordering step selecting a last pointer in said pointer table for said one level, and ending the search of said one level in response to completion of a search of a last block obtained with said last pointer from said machine-ordering step, whereby a last pointer of the last block in the index of said level addresses a required block in a next lower level.

17. A method of searching as defined in claim 16 comprising machine signalling when all blocks in said level have been searched, and machine indicating the correct pointer as a last pointer of a last read block in response to said last machine-signalling step.

18. A method of searching for a search argument in any high-level block in a multilevel compressed index, comprising machine selecting any high-level block in said index in which compressed keys are paired with a respective pointer for addressing a related block in the next lower level of said index, machine resetting a search-argument equal counter to an initial state prior to searching said block, machine reading said block, machine comparing the search argument with the respective pairs of compressed keys in said block in their ordered sequence, machine incrementing said equal counter to indicate the next current search-argument byte position upon each key byte comparing equal with a current byte of said search argument, machine indicating the next lower-ordered byte position of said search argument as its current searched-for byte position in response to said machine-incrementing step, and machine selecting any pointer associated with a pair of compressed keys in which either compressed key of the pair compares high with the current searched-for byte.

19. A method of searching for a search argument in any level of an index, having a pointer table with the addresses of the blocks in said level sequenced in the sorted order of said blocks, comprising machine selecting said blocks in said level for searching in any predetermined order, machine resetting a search argument equal counter prior to searching any block accessed by said machine-selecting step, machine searching a sequence of compressed keys in said any block, machine selecting a next block when a search of a prior block does not find the search argument, and machine storing a pointer associated with any compressed key in a searched block which first compares high with said search argument.

20. A method of searching is defined in claim 19 comprising machine signalling when said pointer stored by said machine-storing step is between the first and last pointers in its block, and ending said search in response to said machine-signalling step.

21. A method of searching as defined in claim 19 comprising other machine signalling when said pointer stored by said machine-storing step is the last pointer of its block, and machine selecting another block at the same level for searching in response to said other machine-signalling step.

22. A system of searching for a search argument in a multilevel index having a high-level format in which each index entry includes a pair of compressed keys associated with a respective pointer, and a low-level format in which each entry includes a single compressed key associated with a respective pointer, comprising means for selecting an initial high-level block in said index as the first compressed block in the search, means for resetting a search argument equal counter to an initial state prior to searching any block in said index, means for reading said high-level block, means for comparing the search argument with the respective pairs of compressed key in said initial block in their ordered sequence, means for incrementing said equal counter to indicate a current searched-for byte position of said search argument upon each key byte comparing equal with a current searched-for byte of said search argument, means for indicating the next lower-ordered byte position of said search argument as its current searched-for byte position in response to said incrementing means, means for retrieving a pointer associated with a pair of compressed keys in which either compressed key of the pair compared high with the current search-argument byte, and means for transferring to a central processing unit the pointer obtained by said retrieving means for accessing the storage device addressed by said pointer for accessing the next lower level index block, whereby said pointer addresses a block in a next lower level of said index.

23. A system of searching as defined in claim 22 in which said selecting means selects a highest level block of the multilevel index as said initial high-level block, whereby said highest level block is an apex block of said index.

24. A system for searching as defined in claim 22 in which said selecting means selects any block of the multilevel index as said initial high-level block, whereby a search begins with a high-level block other than an apex block.

25. A system of searching as defined in claim 22 in which said means for transferring obtains a pointer which addresses a high-level block in the next lower level, said system comprising means for next selecting the block addressed by said pointer, and means for applying said resetting means, reading means, comparing means, incrementing means, indicating means, retrieving means, and transferring means to the block obtained by said next selecting means, whereby a last-retrieved pointer addresses a next lower level of said index.

26. A system as defined in claim 22 in which said means for transferring obtains a pointer which addresses a low-level block, said system comprising, means for further selecting said low-level block, means for resetting said search argument equal counter to an initial state prior to searching said low-level block, means for reading said low-level block obtained by said further selecting means, means for comparing the search argument with the respective compressed keys in said low-level block in their ordered sequence, means for incrementing said equal counter to indicate the current search-argument byte position upon any key byte comparing equal with a current byte of said search argument, means for indicating the next lower-ordered byte position of said search argument as its current byte position in response to said last-mentioned incrementing means, and means for retrieving a pointer associated with a compressed key which first compares high in said low-level block with the current byte of the search argument, whereby the last-retrieved pointer addresses a data block being searched-for by said search argument.

27. A system of searching for a search argument in one level of a compressed index using a pointer table with the addresses of blocks in said one level sequenced in the sorted order of said blocks, comprising means for ordering the selection of pointers in said table, each next selection of a pointer being in response to a predetermined type of pointer-position signal, means for selecting block addressed by a first pointer selected from said pointer table, means for resetting a search-argument equal counter to an initial state prior to searching said block, means for reading said block obtained by said selecting means, means for comparing the search argument with the respective compressed keys in said block in their ordered sequence, means for incrementing said equal counter to indicate the current search-argument byte position upon each key byte comparing equal with a current byte of said search argument, means for indicating the next lower-ordered byte of said search argument as its current byte in response to said incrementing means, means for retrieving the pointer associated with any compressed key in said block which first compares high with the current search argument byte, and means for signalling pointer-position signals for relating the pointer obtained by said retrieving means to the location of the pointer in its block.

28. A system as defined in claim 27 in which said signalling means includes means for generating a last-position signal to indicate when the pointer obtained by said retrieving means is the last pointer in its block.

29. A system as defined in claim 27 in which said signalling means includes means for generating an intermediate-position signal to indicate the pointer obtained by said retrieving means is between the first and last pointers in said block.

30. A system as defined in claim 27 in which said signalling means includes means for generating a first-position signal to indicate the pointer obtained by said retrieving means is the first pointer of a block in said index.

31. A system of searching as defined in claim 27, in which said signalling means includes means for generating a first-position signal to indicate when the pointer obtained by said retrieving means is the first pointer in its block and its block is not the first block of its level.

32. A system of searching as defined in claim 27, comprising means for selecting the next block addressed by a next pointer selected from the pointer table in response to said ordering means responding to any of said pointer-position signals from said signalling means.

33. A system of searching as defined in claim 32 comprising means for sensing for a predetermined form or sequence of said pointer-position signals to indicate a search-completion signal.

34. A system of searching as defined in claim 32 in which said ordering means selects pointers from said pointer table in the sorted sequence of the blocks in said one level, whereby a sequential one-level search is obtained.

35. A system of searching as defined in claim 32 in which said ordering means selects pointers from said pointer table in a binary-search sequence which is responsive to said means for signalling step.

36. A system as defined in claim 29 further comprising means for ending said search at said one level in response to said intermediate-position signal being provided by said generating means,
whereby a last-retrieved pointer addresses a next-required block in a next lower level.

37. A system of searching as defined in claim 34 comprising means for sensing an end of index upon said ordering means selecting a last pointer in said pointer table for said one level, and
means for ending the search of said one level in response to completion of a search of a last block obtained with the last pointer from said ordering means,
whereby a last pointer of a last sequential block in the index of said level addresses a required block in the next lower level.

38. A system of searching as defined in claim 37 comprising means for end signalling when all blocks in said level have been searched,
and means for indicating the correct pointer as a last pointer of a last read block in response to said end signalling means.

39. A system of searching for a search argument in any high-level block in a multilevel compressed index, comprising
means for selecting any high-level block in said index in which compressed keys are paired with a respective pointer for addressing a related block in the next lower level of said index,
means for resetting a search-argument equal counter to an initial state prior to searching said block,
means for reading said block,
means for comparing the search argument with the respective pairs of compressed keys in said block in their ordered sequence,
means for incrementing said equal counter to indicate the next current search-argument byte position upon each key byte comparing equal with a current byte of said search argument,
means for indicating the next lower-ordered byte position of said search argument as its current searched-for byte position in response to said incrementing means,
and means for selecting any pointer associated with a pair of compressed keys in which either compressed key of the pair compares high with the current searched-for byte.

40. A system of searching for a search argument in any level of an index, having a pointer table with the addresses of the blocks in said level sequenced in the sorted order of said blocks, comprising
means for selecting said blocks in said level for searching in any predetermined order,
means for resetting a search-argument equal counter prior to searching any block accessed by said means for selecting,
and means for storing a pointer associated with any compressed key in a searched block which first compares high with said search argument.

41. A system of searching as defined in claim 40 comprising means for signalling when said pointer stored by said storing means is between the first and last pointers in its block,
and means for ending said search in response to said signalling means.

42. A system of searching as defined in claim 40 comprising means for other signalling when said pointer stored by said storing means is the last pointer of its block,
and means for selecting another block at the same level for searching in response to said other signalling means.

* * * * *